(12) United States Patent
Ichikawa et al.

(10) Patent No.: US 10,928,611 B2
(45) Date of Patent: Feb. 23, 2021

(54) LENS MODULE AND PROJECTOR

(71) Applicant: Sony Corporation, Tokyo (JP)

(72) Inventors: Susumu Ichikawa, Aichi (JP); Takashi Kobayashi, Kanagawa (JP); Fumihiko Hanzawa, Tokyo (JP); Masami Sato, Chiba (JP); Yusuke Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 251 days.

(21) Appl. No.: 16/068,479

(22) PCT Filed: Jan. 4, 2017

(86) PCT No.: PCT/JP2017/000009
§ 371 (c)(1),
(2) Date: Jul. 6, 2018

(87) PCT Pub. No.: WO2017/122551
PCT Pub. Date: Jul. 20, 2017

(65) Prior Publication Data
US 2019/0033564 A1    Jan. 31, 2019

(30) Foreign Application Priority Data

Jan. 14, 2016    (JP) ............................. JP2016-004932

(51) Int. Cl.
*G02B 26/08*    (2006.01)
*G02B 13/24*    (2006.01)
(Continued)

(52) U.S. Cl.
CPC ............... *G02B 13/24* (2013.01); *G02B 3/02* (2013.01); *G02B 5/10* (2013.01); *G02B 13/16* (2013.01);
(Continued)

(58) Field of Classification Search
CPC .... G02B 13/24; G02B 13/16; G02B 17/0852; G02B 5/10; G02B 26/10; G02B 27/18;
(Continued)

(56) References Cited

U.S. PATENT DOCUMENTS

| 2010/0302516 | A1 | 12/2010 | Rehn |
| 2014/0126032 | A1 | 5/2014 | Yatsu et al. |
| 2015/0177600 | A1* | 6/2015 | Matsubara ............. G03B 21/28 353/31 |

FOREIGN PATENT DOCUMENTS

| JP | 2006-337528 A | 12/2006 |
| JP | 2009-031684 A | 2/2009 |

(Continued)

OTHER PUBLICATIONS

Extended European Search Report dated Nov. 28, 2018 for corresponding European Application No. 17738306.4.

*Primary Examiner* — Euncha P Cherry
(74) *Attorney, Agent, or Firm* — Michael Best & Friedrich LLP

(57) ABSTRACT

Disclosed herein is a lens module for a projector of laser scanning type which is focus-free and has a short throw distance. In one example, a lens module includes a first optical member including a free-curved lens that passes a beam light reflected by a minute vibrating mirror; and a second optical member including a free-curved mirror to reflect the beam light which has passed through the first optical member, or a free-curved lens to pass the beam light which has passed through the first optical member. The beam light, which has been reflected by or has passed through the second optical member, has at the same position beam waists in horizontal and vertical directions perpendicular to a propagating direction of the beam light and also has beam radii coinciding in the horizontal and vertical directions.

14 Claims, 21 Drawing Sheets

(51) Int. Cl.
*G02B 26/10* (2006.01)
*G02B 13/18* (2006.01)
*G02B 3/02* (2006.01)
*G02B 27/18* (2006.01)
*G02B 5/10* (2006.01)
*G02B 17/08* (2006.01)
*G02B 13/16* (2006.01)
*G02B 27/00* (2006.01)
*H04N 9/31* (2006.01)

(52) U.S. Cl.
CPC ......... *G02B 13/18* (2013.01); *G02B 17/0852* (2013.01); *G02B 26/0833* (2013.01); *G02B 26/10* (2013.01); *G02B 26/101* (2013.01); *G02B 27/0031* (2013.01); *G02B 27/18* (2013.01); *H04N 9/3129* (2013.01)

(58) Field of Classification Search
CPC ...... G02B 3/02; G02B 13/18; G02B 27/0031; G02B 26/101; G02B 26/0833; H04N 9/3129
USPC ....................................................... 359/205.1
See application file for complete search history.

(56) References Cited

FOREIGN PATENT DOCUMENTS

| | | | |
|---|---|---|---|
| JP | 5041923 | B2 | 7/2012 |
| JP | 5167634 | B2 | 1/2013 |

\* cited by examiner

FIG. 3
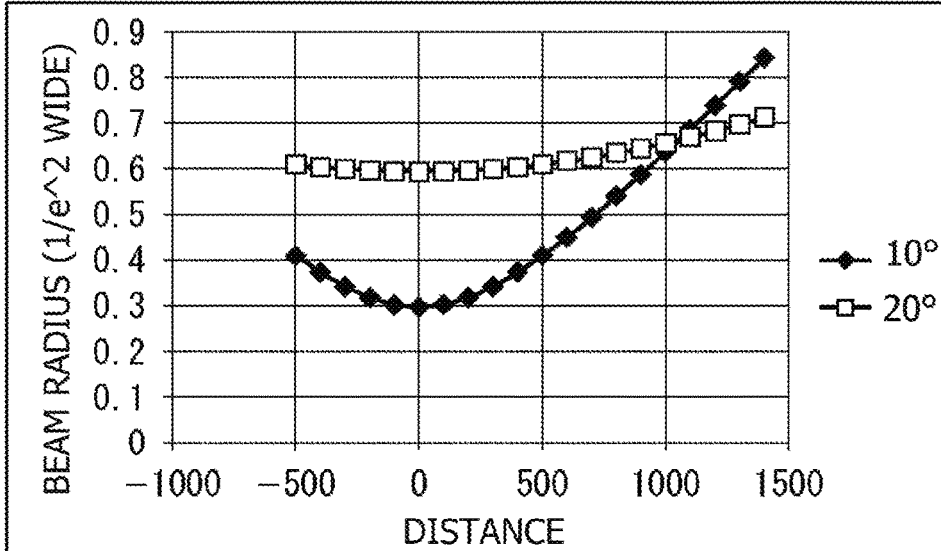
A
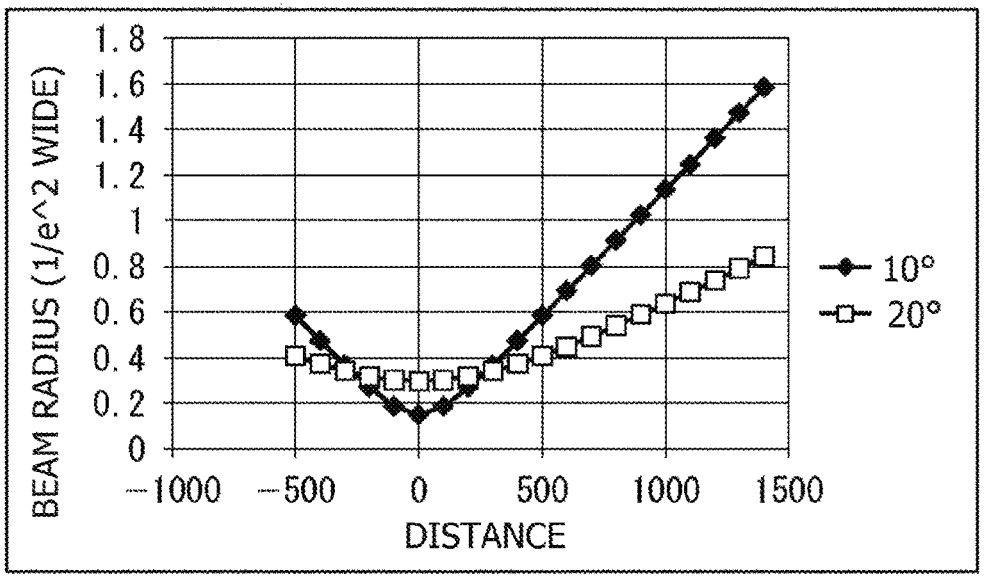
B

FIG. 4
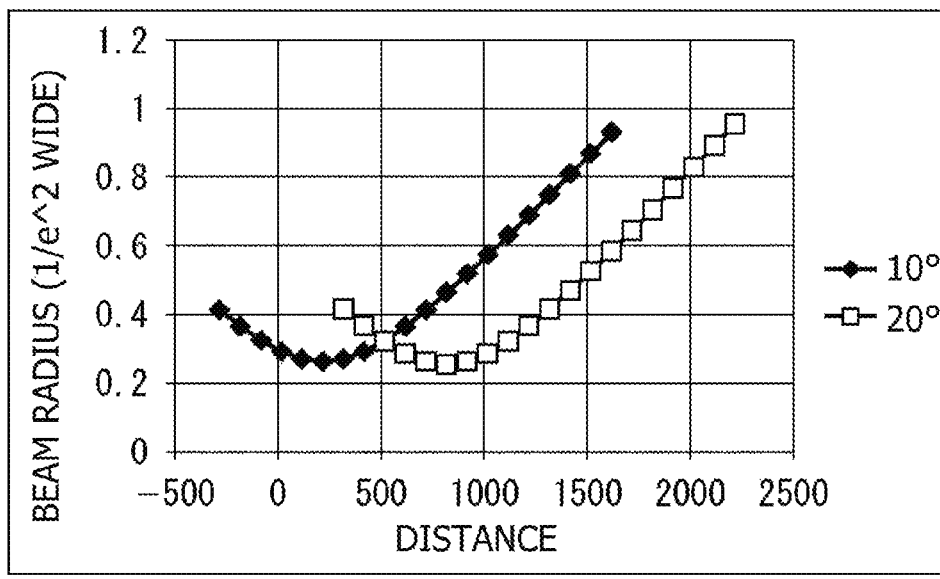
A
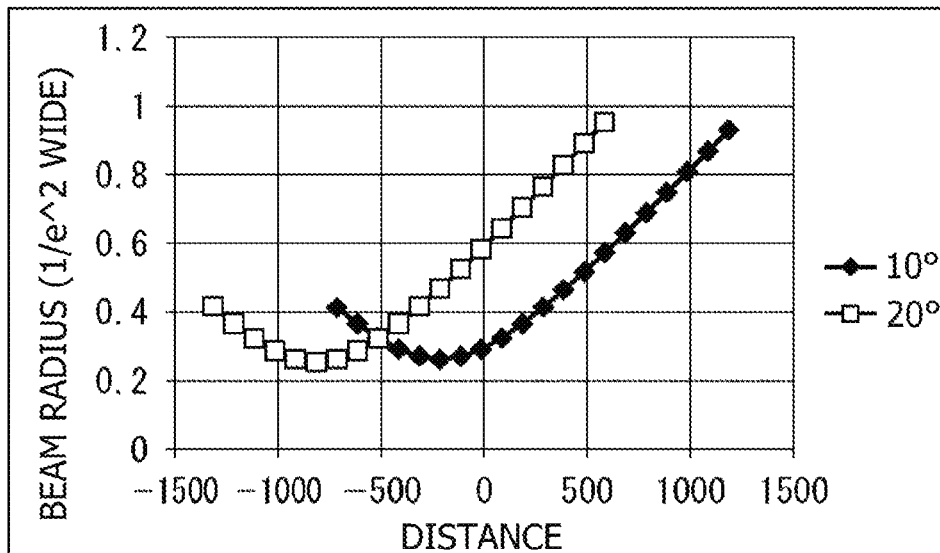
B

F I G. 5

FOR FFP AT 10°, WAVELENGTH 525 nm

|    | f     | s     | ω      | d'      |
|----|-------|-------|--------|---------|
| LD |       | 2.12  | 0.0011 |         |
| L1 | 2.00  | 70.00 | 0.0191 | 35.86   |
| L2 | 15.00 | 49.79 | 0.0149 | 26.60   |
| L3 | 24.43 |       | 0.2000 | −200.00 |

F I G. 6

FOR FFP AT 20°, WAVELENGTH 525 nm

|    | f     | s     | ω      | d'      |
|----|-------|-------|--------|---------|
| LD |       | 2.12  | 0.0006 |         |
| L1 | 2.00  | 70.00 | 0.0096 | 35.99   |
| L2 | 17.15 | 49.79 | 0.0097 | 34.60   |
| L3 | 15.70 |       | 0.2000 | −200.00 |

| FOR FFP AT 10°, WAVELENGTH 525 nm ||||||
| --- | --- | --- | --- | --- |
|  | f | s | ω | d' |
| LD |  | 2.12 | 0.0011 |  |
| L1 | 2.00 | 70.00 | 0.0191 | 35.86 |
| L2 | 15.00 | 49.79 | 0.0149 | 26.60 |
| L3 | 24.43 |  | 0.2000 | −200.00 |

| | f | s | ω | d' |
|---|---|---|---|---|
| LD | | 2.12 | 0.0006 | |
| L1 | 2.00 | 70.00 | 0.0096 | 35.99 |
| L2 | 16.86 | 49.79 | 0.0094 | 33.42 |
| L3 | 16.65 | | 0.2611 | -200.00 |

FOR FFP AT 20°, WAVELENGTH 525 nm

FIG. 11

FOR FFP AT 10°, WAVELENGTH 525 nm

|     | f     | s     | ω      | d'      |
|-----|-------|-------|--------|---------|
| LD  |       | 2.12  | 0.0011 |         |
| L1  | 2.00  | 70.00 | 0.0191 | 35.86   |
| L2  | 15.00 | 55.15 | 0.0149 | 26.60   |
| L3  | 30.37 |       | 0.2000 | −300.00 |

FIG. 12

FOR FFP AT 20°, WAVELENGTH 525 nm

|     | f     | s     | ω      | d'      |
|-----|-------|-------|--------|---------|
| LD  |       | 2.12  | 0.0006 |         |
| L1  | 2.00  | 70.00 | 0.0096 | 35.99   |
| L2  | 17.73 | 55.15 | 0.0104 | 37.01   |
| L3  | 18.48 |       | 0.2611 | −200.00 |

LENS DATA: DEPICTED IN THE ORDER OF LIGHT PASSAGE

| | REFRACTIVE INDEX | YDE (mm) | ZDE (mm) | ADE (DEGREE) |
|---|---|---|---|---|
| LIGHT EMITTING POINT | 1.000 | 0 | −2.004 | 0 |
| L1 | 1.000 | 0 | 0 | 0 |
| L2-R1 PLANE | 1.512 | 0 | 10 | 0 |
| L2-R2 PLANE | 1.000 | 0 | 12 | 0 |
| MEMS | −1.000 | −0.108 | 16.8 | −15 |
| L2-R2 PLANE | −1.512 | 0 | 12 | 0 |
| L2-R1 PLANE | −1.000 | 0 | 10 | 0 |
| L3-R1 PLANE | −1.512 | 0 | 8 | 0 |
| L3-R2 PLANE | −1.000 | 0 | 5 | 0 |
| SCREEN | −1.000 | 64.597 | −224.681 | −15 |

F I G. 1 7

| | L2-R1 PLANE | L2-R2 PLANE | L3-R1 PLANE | L3-R2 PLANE |
|---|---|---|---|---|
| \multicolumn{5}{l}{DATA OF PLANE SHAPE: COEFFICIENTS OF X-Y POLYNOMIAL, ASSUMING THAT R = ∞ FOR ALL PLANES.} |
| Y | 6.6469E−01 | 8.2769E−01 | 9.6627E−01 | −6.6365E−01 |
| X2 | −1.3701E−01 | −1.4731E−01 | 5.5707E−02 | 3.7772E−02 |
| Y2 | 1.1376E−01 | 5.6824E−02 | 1.4730E−01 | 1.1474E−01 |
| X2Y | −6.3466E−02 | −3.5940E−02 | 1.7670E−02 | 1.1741E−02 |
| Y3 | −3.2554E−02 | −3.8816E−02 | 7.8798E−04 | −2.3353E−03 |
| X4 | −2.0133E−03 | −1.1481E−03 | −4.0458E−04 | −4.0959E−04 |
| X2Y2 | 2.9268E−02 | 3.1312E−02 | −2.6818E−03 | −1.3370E−03 |
| Y4 | 1.2257E−03 | 7.9625E−03 | −8.8603E−04 | −1.0309E−04 |
| X4Y | 2.2705E−04 | −3.9261E−05 | −8.5601E−06 | 4.0253E−05 |
| X2Y3 | −2.7998E−03 | −3.9906E−03 | 1.1902E−04 | 6.5861E−05 |
| Y5 | 1.8742E−04 | −1.9957E−04 | 3.4285E−05 | 2.3225E−06 |

FIG. 22

| | REFRACTIVE INDEX | YDE (mm) | ZDE (mm) | ADE (DEGREE) |
|---|---|---|---|---|
| LIGHT EMITTING POINT | 1.000 | 0 | −2.002 | 0 |
| L1 | 1.000 | 0 | 0 | 0 |
| L2-R1 PLANE | 1.512 | 0 | 10 | 0 |
| L2-R2 PLANE | 1.000 | 0 | 12 | 0 |
| MEMS | −1.000 | 0.008 | 16.8 | −15 |
| L2-R2 PLANE | −1.512 | 0 | 12 | 0 |
| L2-R1 PLANE | −1.000 | 0 | 10 | 0 |
| MIRROR PLANE | 1.000 | 7.873 | −12.554 | 56.415 |
| SCREEN | 1.000 | −40.823 | 169.184 | −15 |

LENS DATA: DEPICTED IN THE ORDER OF LIGHT PASSAGE

FIG. 23

DATA OF PLANE SHAPE: COEFFICIENTS OF X-Y POLYNOMIAL, ASSUMING THAT R = ∞ FOR ALL PLANES.

|  | L2-R1 PLANE | L2-R2 PLANE | MIRROR PLANE |
|---|---|---|---|
| Y | 2.3408E−01 | 3.4941E−01 | 1.8620E+00 |
| X2 | 9.9051E−02 | 9.6025E−02 | −1.5274E−02 |
| Y2 | 1.4477E−01 | 1.5652E−01 | −4.0778E−02 |
| X2Y | −2.2423E−02 | −3.6061E−02 | 1.9360E−03 |
| Y3 | −1.4094E−02 | −2.5966E−02 | 4.8300E−03 |
| X4 | −3.3239E−03 | −4.7120E−03 | 2.2781E−05 |
| X2Y2 | 1.6477E−03 | 6.6889E−03 | −1.4331E−04 |
| Y4 | 1.9425E−03 | 4.4779E−03 | −1.9867E−04 |
| X4Y | 5.5943E−04 | 1.3143E−03 | −5.0079E−06 |
| X2Y3 | 1.1019E−04 | 1.9665E−04 | 7.3515E−06 |
| Y5 | −1.1566E−04 | 1.4834E−06 | −1.7643E−06 |
| X6 | 0.0000E+00 | 0.0000E+00 | −1.9449E−08 |
| X4Y2 | 0.0000E+00 | 0.0000E+00 | 6.1704E−07 |
| X2Y4 | 0.0000E+00 | 0.0000E+00 | −3.2529E−07 |
| Y6 | 0.0000E+00 | 0.0000E+00 | 6.9801E−07 |
| X6Y | 0.0000E+00 | 0.0000E+00 | 2.8392E−09 |
| X4Y3 | 0.0000E+00 | 0.0000E+00 | −4.3751E−08 |
| X2Y5 | 0.0000E+00 | 0.0000E+00 | 2.3060E−08 |
| Y7 | 0.0000E+00 | 0.0000E+00 | −3.2480E−08 |
| X8 | 0.0000E+00 | 0.0000E+00 | 9.7238E−12 |
| X6Y2 | 0.0000E+00 | 0.0000E+00 | −1.5017E−10 |
| X4Y4 | 0.0000E+00 | 0.0000E+00 | 1.3420E−09 |
| X2Y6 | 0.0000E+00 | 0.0000E+00 | −9.7948E−10 |
| Y8 | 0.0000E+00 | 0.0000E+00 | 5.1414E−10 |

LENS MODULE AND PROJECTOR

TECHNICAL FIELD

The present disclosure relates to a lens module and a projector, more particularly, to a lens module that employs a MEMS (Micro Electro Mechanical System) mirror and a projector of laser scanning type provided therewith for reduction of its throw distance.

BACKGROUND ART

There has recently been a growing demand for small portable projectors capable of throwing images onto the screen placed comparatively close to the projector's enclosure.

A small-sized projector having a short throw distance will be used in such a manner as depicted in FIG. 1.

That is a projector 1 lying horizontal is required to be able to throw with the image in a high angle of view onto a screen 2, resembling a wall, placed comparatively close to it, as depicted in Part A of FIG. 1. Also, the projector 1 standing vertical is required to be able to throw the image onto a table top 3, as a screen, on which it is placed, as depicted in Part B of FIG. 1.

Existing projectors are dominated by those of panel type which are so designed as to throw the image which is displayed on an image-forming element such as LCOS (Liquid Crystal On Silicon) or DMD (Digital Micro mirror Device) onto the screen by means of the throwing optical system such as LD (laser diode) (see, PTL 1, for example).

Although there exists the projectors of panel type capable of throwing images at a short distance, they have difficulty with size reduction because they need an optical system (including lenses and mirrors) to significantly enlarge the image displayed on the image-forming element. Particularly, the projector of panel type with a short throw distance which employs LCOS or DMD cannot be made portable easily because it needs focusing processes over the entire ranges on the screen when the projector is installed so that the image on the image-forming element is optically transferred onto the screen.

There has also been proposed the projector of laser scanning type which causes the beam flux from the light source to scan over the screen by means of a MEMS mirror, thereby producing images on the screen. (see. PTL 2).

CITATION LIST

Patent Literature

[PTL 1]
Japanese Patent No. 5041923
[PTL 2]
Japanese Patent No. 5167634

SUMMARY

Technical Problem

Any attempt to miniaturize the projector of laser scanning type is hampered by the fact that the light source is restricted almost to the LD. The LD emits a beam light which is not parallel but scatters from an emitting point in conformity with Gaussian distribution. Accordingly, this makes it indispensable to install an optical system (called collimator lens) in order to be focused the beam behind the LD. The collimator lens converts the beam emanating from the LD into a nearly parallel light. This leads to focus free that permits the image to maintain a certain level of resolution regardless of the distance between the projector and the screen.

Nevertheless, focus free is practically realized only in a case where the screen is placed behind farther than a certain position behind the collimator lens. (This position is called beam waist hereinafter, and it will be described in more detail later). In other words, focus free is not realized in the case where the screen is positioned closer to the collimator lens than the beam waist, which aggravates resolution. The foregoing is the reason why it has been difficult to realize a small-sized projector of laser scanning type which has a short throw distance to project images onto the screen placed close to it.

The present disclosure is completed to tackle the foregoing problem. It is an object of the present disclosure to provide a focus-free projector of laser scanning type with a short throw distance.

Solution to Problem

The first aspect of the present disclosure relates to a lens module to be used for a projector. The lens module includes: a scanning unit that scans a beam light two-dimensionally by minute vibration while reflecting the beam light from a light source; a first optical member including a free-curved lens that passes the beam light which has been reflected by the scanning unit; and a second optical member including a free-curved mirror to reflect the beam light which has passed through the first optical member or a free-curved lens to pass the beam light which has passed through the first optical member. The beam light, which has been reflected by or has passed through the second optical member, has at the same position beam waists in horizontal and vertical directions perpendicular to each other in a propagating direction of the beam light and also has beam radii coinciding in the horizontal and vertical directions.

The beam light, which has been reflected by or has passed through the second optical member, may have at the same position beam waists in the horizontal and vertical directions perpendicular to each other in the propagating direction of the beam light and also have beam radii coinciding at the beam waist in the horizontal and vertical directions.

The beam light, which has been reflected by or has passed through the second optical member, may have beam waists in the horizontal and vertical directions perpendicular to each other in the propagation direction of the beam light, the beam waists coinciding at a position a distance z away from the second optical member, where the distance z satisfies a formula below in which $\lambda$ denotes a wavelength of the beam light and $\omega_0$ denotes a beam radius at the beam waist of the beam light.

$$\lambda z / \Pi \omega_0^2 < 1$$

In such a case that the lens module projects the beam light, which has been reflected or has passed through the second optical member, to a screen, which is arranged aslant with respect to the propagation direction of the beam light, the beam radius at the beam waist may be larger than in a case where the lens module projects the beam light to the screen arranged perpendicular to the propagation direction of the beam light. The beam light, which has been reflected by or has passed through the second optical member, may have respective beam radii in the horizontal and vertical directions nearly coinciding on the screen arranged aslant.

In such a case that the lens module projects the beam light, which has been reflected by or has passed through the second optical member, to the screen, which is arranged aslant with respect to the propagation direction, the beam radius at the beam waist may increase in proportion to an incident angle of the beam light; and the beam light, which has been reflected by or has passed through the second optical member, may have respective beam radii in the horizontal and vertical directions nearly coinciding on the screen arranged aslant.

The lens module according to the first aspect of the present disclosure may further include: a collimator lens which is arranged between the light source and the minute vibrating mirror and which converts Gaussian beam emanating from the light source into the beam light which is parallel in terms of geometrical optics.

The scanning unit may be a MEMS mirror.

The first optical member may cause the beam light to pass through before it is reflected by the MEMS mirror as the scanning unit and also cause the beam light, which has been reflected by the MEMS mirror, to pass through.

The lens module may produce the beam light projected to the screen in such a way as to give a nearly straight locus in either a horizontal direction or a vertical direction.

The projector according to a second aspect of the present disclosure includes a light source that emits Gaussian beam; a collimator lens that converts the Gaussian beam emanating from the light source into a beam light which is parallel in terms of geometrical optics; a scanning unit that scans the beam light two-dimensionally by minute vibration while reflecting a beam light from a light source; a first optical member including a free-curved lens that passes the beam light which has been reflected by the scanning unit; and a second optical member including a free-curved mirror that reflects the beam light which has passed through the first optical member or a free-curved lens to pass the beam light which has passed through the first optical member. The beam light, which has been reflected by or has passed through the second optical member, has at the same position beam waists in horizontal and vertical directions perpendicular to each other in a propagating direction of the beam light and also has beam radii coinciding in the horizontal and vertical directions.

According to the first and second aspects of the present disclosure, the beam light which has been reflected by or has passed through the second optical member, has the beam waists at the same position in the horizontal and vertical directions perpendicular to each other in the propagation direction of the beam light and also has their respective beam radii coinciding in the horizontal and vertical directions.

Advantageous Effect of Invention

The first aspect of the present disclosure can realize a lens module for a focus-free projector of laser scanning type with a short throw distance.

The second aspect of the present disclosure can realize a focus-free projector of laser scanning type with a short throw distance.

BRIEF DESCRIPTION OF DRAWINGS

FIG. 3 is a diagram depicting how the beam varies in radius in the horizontal and vertical directions in a case where a beam light is made parallel, in terms of geometrical optics, by a collimator lens.

FIG. 4 is a diagram depicting how the beam varies in radius in the horizontal and vertical directions in a case where the beam light is not made parallel, in terms of geometrical optics, by the collimator lens.

FIG. 5 is a tabular representation of lens data in the horizontal direction according to a first embodiment.

FIG. 6 is a tabular representation of the lens data in the vertical direction according to the first embodiment.

FIG. 11 is a tabular representation of the lens data in the horizontal direction according to a third embodiment.

FIG. 12 is a tabular representation of the lens data in the vertical direction according to the third embodiment.

FIG. 17 is a tabular representation of coefficients of X-Y polynomial expressions.

FIG. 22 is a tabular representation of the lens data of the lens module according to the fifth embodiment.

FIG. 23 is a tabular representation of the coefficients of the X-Y polynomial expressions.

DESCRIPTION OF EMBODIMENT

The best mode for carrying out the present disclosure (which is referred to as the embodiment hereinafter) will be described below in more detail with reference to the accompanying drawings. The description will be preceded by an explanation as to the characteristics of the laser beam emanating from the LD.

<Characteristics of Laser Beam Emanating from LD>

Figure 1:
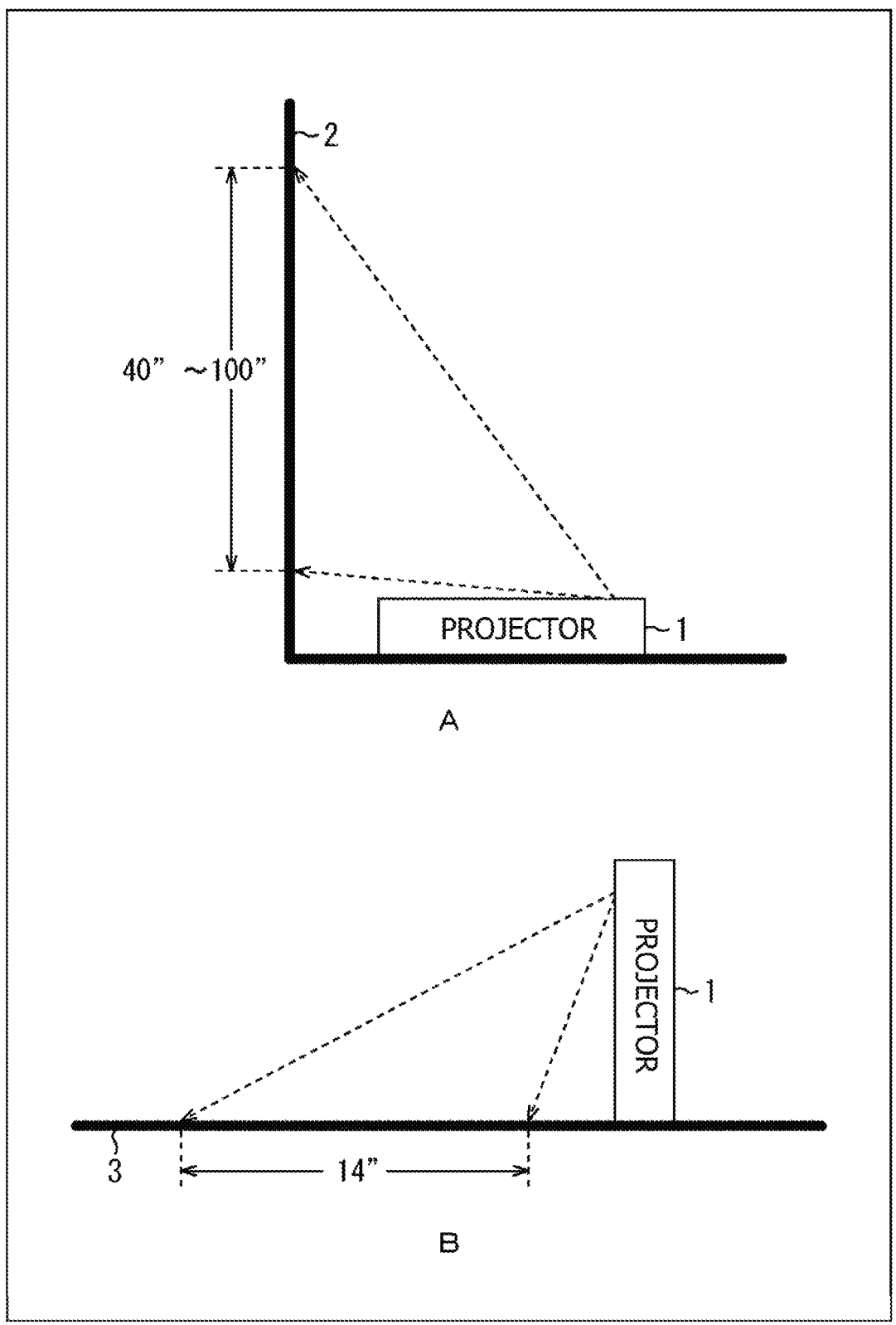
FIG. 1 is a diagram illustrating a small-sized projector with a short throw distance which is in operation.
Figure 2:
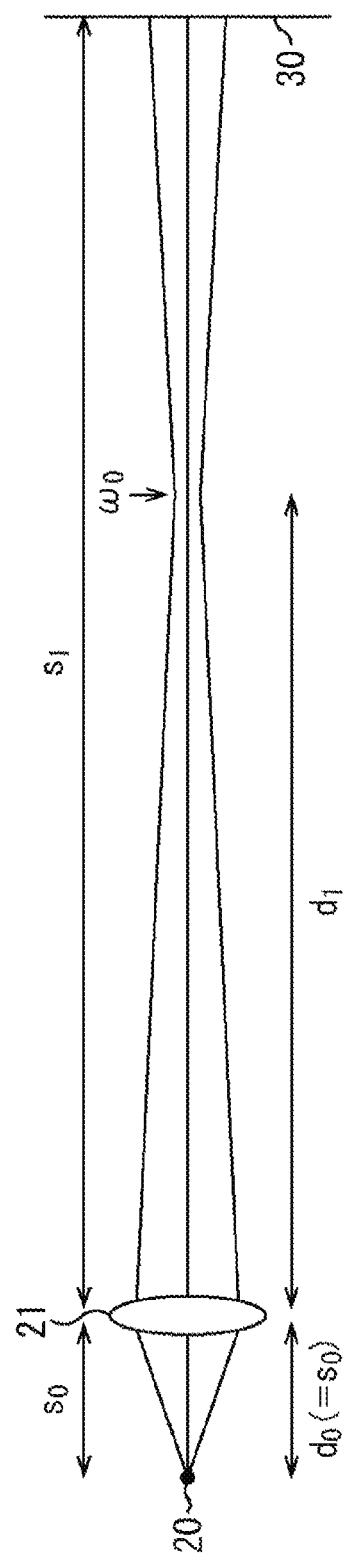
FIG. 2 is a diagram to explain the characteristics of a laser beam emanating from an LD.

FIG. 2 is presented to explain the characteristics of a laser beam emanating from an LD.

An LD 20 emits the beam light which diverges from the emitting point of because it varies in angular intensity distribution according to the Gaussian distribution. The emitted beam is converted into parallel light in terms of geometrical optics by a collimator lens 21 arranged behind the LD 20. In this specification, the term Gaussian beam is used to denote the beam light that varies in angular intensity distribution according to the Gaussian distribution.

However, the Gaussian beam which has passed through the collimator lens 21 is a parallel light, in terms of geometrical optics, but is not a parallel light, in term of wave optics, and consequently the Gaussian beam gradually decreases in beam diameter as it travels to the position called beam waist and then it gradually increases in beam diameter as it travels beyond that position.

Owing to this, in the case where a screen 30 is placed at a position closer to the collimator lens 21 than to the beam waist, the image size decreases but the beam diameter increases, thereby extremely aggravating the image resolution. Conversely, in the case where the screen 30 is placed sufficiently far away from the beam waist, both the image size and the beam diameter linearly increase, which creates a focus-free state while keeping the image resolution unchanged.

The following discussion aims to prove, from the standpoint of wave optics, whether or not it is possible to realize a projector of laser scanning type with a short throw distance and a focus-free state even though it has only the collimator lens 21.

The Gaussian beam emanating from the LD 20 (which is a laser beam that varies in angular intensity distribution according to the Gaussian distribution) has a theoretical beam radius $\omega$ that can be expressed by the Formula (1) below at the position a distance z away from the beam waist.

[Math 1]

$$\omega^2 = \omega_0^2 \left\{ 1 + \left( \frac{\lambda z}{\pi \omega_0^2} \right)^2 \right\} \quad (1)$$

In here, the beam radius denotes the width of the beam at which the beam intensity is $(1/e^2)$, $\omega_0$ denotes the beam radius at the beam waist, and $\lambda$ denotes the wavelength of Gaussian beam.

It is apparent from Formula (1) that the beam radius $\omega$ gradually approaches Formula (2) below as the distance z increases. In other words, the beam radius $\omega$ increases in proportion to the distance z.

[Math 2]

$$\omega = \frac{\lambda}{\pi \omega_0} z \quad (2)$$

On the other hand, the image size on the projector also increases in proportion to the distance, which leads to the focus-free state. In order to achieve the focus-free state with an adequate resolution, it is necessary to determine the proportional coefficient and the $\omega_0$, substantially, so that the angle of view of the projector conforms to the design specification (such as the swing angle of MEMS and the specification for magnification of the optical system).

In the meantime, the Gaussian beam emanating from the LD 20 usually takes on the FFP (Far Field Pattern) of elliptic beam, with the horizontal radius and the vertical radius differing from each other as much as approximately twice. Therefore, it is necessary to consider Formula (2) separately for the horizontal and vertical directions.

The size of the image plane, which is calculated by multiplying the beam diameter by the number of pixels, may be represented by Formula (3) below which differs depending on the direction, or the horizontal and vertical directions. In Formula (3), $\theta_h$ denotes the horizontal angle of view of the projector, $\theta_v$ denotes the vertical angle of view of the projector, h denotes the number of pixels in the horizontal direction, v denotes the number of pixels in the vertical direction, $\omega_h$ denotes the beam radius in the horizontal direction at the beam waist, and $\omega_v$ denotes the beam radius in the vertical direction at the beam waist.

[Math 3]

$$\frac{2\lambda h}{\pi \omega_h} = 2\tan\left(\frac{\theta_h}{2}\right) \quad (3)$$
$$\frac{2\lambda v}{\pi \omega_v} = 2\tan\left(\frac{\theta_v}{2}\right)$$

Incidentally, the foregoing arguments up to Formula (3) are based only on the change in radius of Gaussian beam that travels in the air; and another arguments will be necessary to estimate the radius of Gaussian beam which has passed through the actual optical system such as lenses.

What follows next concerns how the optical system affects the distance from the LD 20 to the beam waist and the radius of Gaussian beam.

In general, there is no agreement between the image plane based on geometrical optics and the position of beam waist based on wave optics. Consequently, the following argument is explained on the basis of the propagation formula for beam waist in geometrical optics. Incidentally, the propagation formula is similar to but not identical with the imaging formula in geometrical optics. In addition, it is assumed in the following argument that the optical system includes only of the collimator lens.

The beam emanating from the collimator lens 21 has a beam diameter $\omega_0$ at the beam waist, and the distance $d_1'$ from the collimator lens 21 to the beam waist is expressed by Formula (4) below.

[Math 4]

$$\omega_0^2 = \omega_{-1}^2 \frac{f_1^2}{(f_1 - d_0)^2 + \left(\frac{\pi \omega_{-1}^2}{\lambda}\right)^2} \quad (4)$$

$$d_1' = f_1 + \left(\frac{\omega_0}{\omega_{-1}}\right)^2 (d_0 - f_1)$$

In here, $f_1$ denotes the focal length of the collimator lens 21, $d_0$ denotes the distance (along optical axis) from the emitting point of the LD 20 to the collimator lens 21, and $\omega_{-1}$ denotes the radius of the beam waist before entry into the collimator lens 21.

For example, assuming that the beam is made parallel, in terms of geometrical optics, by the collimator lens 21, then focal length $f_1$ equals the optical axis distance $d_0$ and hence Formula (4) yields Formula (5).

[Math 5]

$$\omega_0 = \frac{\lambda f_1}{\pi \omega_{-1}} \qquad (5)$$

$$d'_1 = f_1$$

With typical values inserted, Formula (5) gave the results as depicted in FIG. 3. The calculations are ono the basis of the assumption that wavelength $\lambda$ is 525 nm, the FFP of the beam light is 10° in horizontal direction and 20° in vertical direction, the focal length $f_1$ is 2 mm (in Part A), and the focal length $f_1$ is 1 mm (in Part B).

It is noted from FIG. 3 that the two curves representing the beam radius in the horizontal and vertical directions incline greatly differently, which suggests that basically there exists a big difference between resolutions in the vertical and horizontal directions. It is concluded that the collimator lens in question is not so desirable although it is focus-free. However, it may be used for an optical system with a short throw distance (for a limited distance to the screen), if the beam diameter does not differ greatly between the horizontal and vertical directions.

The same calculations as above are repeated except that the emitting point of the LD 20 is moved back and forth as follows, with the collimator lens 21 not used to make the beam light parallel in terms of geometrical optics. The results are depicted in FIG. 4. The results depicted in Part A are obtained when the focal length $f_1$=2 mm and the optical axis distance $d_0$=(2 mm+4 μm), and the results depicted in Part B are obtained when the focal length $f_1$=2 mm and the optical axis distance $d_0$=(2 mm-4 μm).

It is noted from FIG. 4 that the two curves representing the beam radius in the horizontal and vertical directions incline in the same way at the position sufficiently away from the collimator lens 21. This suggests that the collimator lens in question is focus-free and has the same resolutions in the horizontal and vertical directions. Nevertheless, the beam waist in the horizontal direction is too far, so that one of the beam radius in the horizontal and vertical directions is large at a distance close to the collimator lens 21, and one of the resolution is good but another resolution is poor in the horizontal and vertical directions within a short distance. This is not desirable for the projector with a short throw distance.

As mentioned above with reference to FIG. 3, any attempt to make the beam waist points coincide with each other in the horizontal and vertical directions results in the beam radius inclining differently according to the distance, which leads to a difference in resolution in the horizontal and vertical directions. Moreover, as mentioned above with reference to FIG. 4, any attempt to make the beam radius incline in the same way at all distances results in the beam waist being positioned differently in the horizontal and vertical directions. This makes it difficult to secure at least one of the resolutions in the horizontal or vertical directions at a short distance.

The foregoing suggests that it is impossible to realize any focus-free projector with a short throw distance simply by changing the position of the collimator lens. In fact, it is only possible to realize a projector which meets requirement for either short throw distance or focus-free.

Consequently, the present disclosure, which is intended to meet requirements for both having a short throw distance and being focus-free, proposes a lens module which includes of a collimator lens and at least two lenses (replaceable by mirrors). Incidentally, this lens module may also include two lenses, with the collimator lens omitted.

So long as the lens module has the beam waist such that its positions and beam radii in the horizontal and vertical directions coincide with each other, the laser light emanating from the LD will make the lens module fulfill the requirements for short throw distance and focus-free even though its FFP differs in angle depending on the horizontal and vertical directions.

As mentioned above, in order for the lens module to be focus-free, it is necessary that the beam light emanating from the final plane of the lens module propagates in such a way as to satisfy Formula (3) in the horizontal and vertical directions. Incidentally, Formula (3) for the final plane of the lens module requires that Formula (6) should be valid because the ordinary screen has the equal pixel numbers in the horizontal and vertical directions.

[Math 6]

$$\omega_h = \omega_v \qquad (6)$$

It is assumed in the following that $\omega_h$ and $\omega_v$ in Formula (3) are same in value. Incidentally, although they may differ from each other, the calculating methods mentioned later will be similarly applied to them.

It is to be noted, however, that the lens module is inevitably asymmetrical with respect to its optical axis, because the laser light source varies in beam radii $\omega_h$ and $\omega_v$ at the beam waist and hence it is impossible to make the beam radii same in the horizontal and vertical directions at the final plane of the lens module which is symmetrical with respect to the optical axis.

First Embodiment of the Present Disclosure

The following argument employs the propagation formula represented by Formula (7) below which is on the basis of the assumption that the lens module has a collimator lens L1, a second lens L2, and a third lens L3, which are arranged sequentially in the last stage of the LD. Incidentally, Formula (7) may be replaced by the BEA command for CODEV to give the same result.

[Math 7]

$$\omega_{n-1}^2 = \omega_{n-1}^2 \frac{f_n^2}{(f_n - d_{n-1})^2 + \left(\frac{\pi \omega_{n-2}^2}{\lambda}\right)^2} \qquad (7)$$

$$d'_n = f_n + \left(\frac{\omega_{n-1}}{\omega_{n-2}}\right)^2 (d_{n-1} - f_n)$$

The lens module is designed such that the laser beam which has passed through the third lens L3 has a beam waist which is 200 mm away from the third lens L3 (toward the screen) and the beam waist has a beam radius $\omega_0$ of 0.2 mm. However, it is assumed that the beam light emanating from the LD has a wavelength $\lambda$ of 525 nm and the FFP is 10° in the horizontal direction and 20° in the vertical direction. It is also assumed that the screen is arranged at the position where the beam, which has passed through the third lens L3, impinges upon it vertically.

The lens module gave the lens data as depicted in FIGS. 5 and 6 which are calculated under the conditions described above.

FIG. 5 depicts the data for FFP at 10° in the horizontal direction, and FIG. 6 depicts the data for FFP at 20° in the vertical direction.

Figures 7, 8:
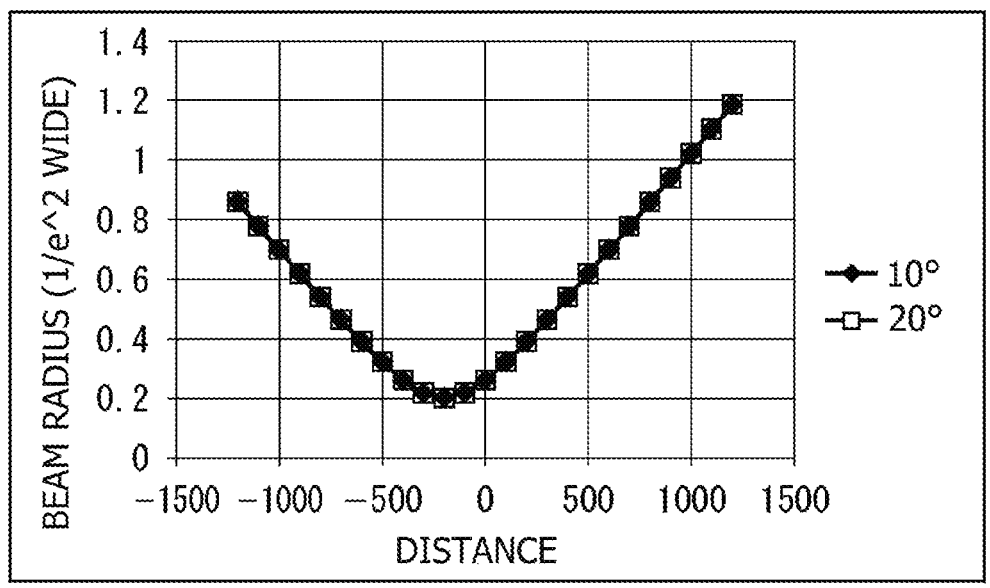
FIG. 7 is a diagram illustrating how the beam radius varies in the first embodiment.
FIG. 8 is a tabular representation of the lens data in the horizontal direction according to a second embodiment.

FIG. 7 depicts the beam radius of the beam light which has passed through the third lens L3, with measurement being based on the position (where distance=0) of the third lens L3.

The beam light which has just emanated from the LD varies in beam diameter in the horizontal and vertical directions; however, as depicted in FIG. 7, the beam light which has passed through the third lens L3 has the same beam radius in the horizontal and vertical directions. Moreover, the distance between the third lens L3 to the beam waist (where the beam radius is minimum) is the same in the horizontal and vertical directions. In other words, the beam light which has passed through the third lens L3 has the same beam radius in the horizontal and vertical directions regardless of the distance.

In this case, the lens module can be used as a projector with an extremely short throw distance because the beam size is small when the screen is positioned near the third lens L3. By contrast, the lens module can be used as a projector with an extremely short throw distance and a wide angle of view because the beam size steeply increases as the screen is positioned far from the third lens L3.

The following description is concerned with the position of the beam waist which the beam light forms after it has passed through the third lens L3, the position being desirable for the projector to be focus-free.

As mentioned above, in order for the projector to be focus-free, it is necessary that both the beam radius and the image size are proportional to the distance z. With Formula (1) above taken into consideration, this condition is satisfied when the beam radius ω is approximately proportional to the distance z and Formula (8) below gives a value sufficiently larger than 1 or smaller than −1.

[Math 8]

$$\frac{\lambda z}{\pi \omega_0^2} \quad (8)$$

In other words, the projector will be most reasonable if the beam waist is within the range indicated by Formula (9), the range excluding the region defined above.

[Math 9]

$$-1 < \frac{\lambda z}{\pi \omega_0^2} < 1 \quad (9)$$

However, Formula (9) may be rewritten as Formula (10) because the screen cannot be arranged at the position where the distance z has a negative value.

[Math 10]

$$\frac{\lambda z}{\pi \omega_0^2} < 1 \quad (10)$$

Thus, it is desirable to place the beam waist at the distance z which satisfies Formula (10).

Since the first embodiment is on the basis of the assumption that the wavelength λ=525 nm and the beam radius $\omega_0$=0.2 mm, the substitution of these values into Formula (10) gives z<39.4 mm. This indicates that it is desirable to design such that the beam waist is at a position which is closer by 239.4 mm from the third lens L3 to the projector from the screen. This condition is satisfied in the first embodiment which is on the basis of the assumption that d'=−200 mm after passage through the third lens L3.

Second Embodiment of the Present Disclosure

The first embodiment mentioned above is on the basis of the assumption that the screen is placed at a position where the beam which has passed through the third lens L3 impinges upon vertically. The second embodiment, which takes the practical use of the projector into consideration, is on the basis of the assumption that the optical axis of the projector is aslant to the screen.

In the case, as in the first embodiment, where the beam light having the same beam radius in the horizontal and vertical directions impinges upon the screen aslant to the optical axis of the beam light, the projected beam light on the screen varies in beam radius in the horizontal and vertical directions according to the slant. The remedy for this is the object of the second embodiment.

Let us assume that the beam light is not aslant in the horizontal direction but is aslant only in the vertical direction, with the incident angle being ϕ=40°, for example, the beam radius in the vertical direction is (1/cos ϕ) times large. This can be corrected by so changing the beam waist in the vertical direction as to satisfy Formula (11) below.

[Math 11]

$$\frac{\lambda v}{\pi \omega_v \cos\phi} = \tan\theta_{v\_max} - \tan\theta_{v\_min} \quad (11)$$

Incidentally, the incident angle ϕ (or the angle with which the beam light impinges aslant upon the screen) varies in response to the position of the screen. Therefore, although it is ideal to change $\omega_v$ according as the screen position changes, calculations may be simplified by representing it by the value corresponding to the incident angle ϕ at the center of the screen image.

The lens module is examined to calculate its lens data under the foregoing conditions. The results are depicted in FIGS. 8 and 9.

FIG. 8 depicts data corresponding to FFP at 10° in the horizontal direction. FIG. 9 depicts data corresponding to FFP at 20° in the vertical direction.

Figures 9, 10:
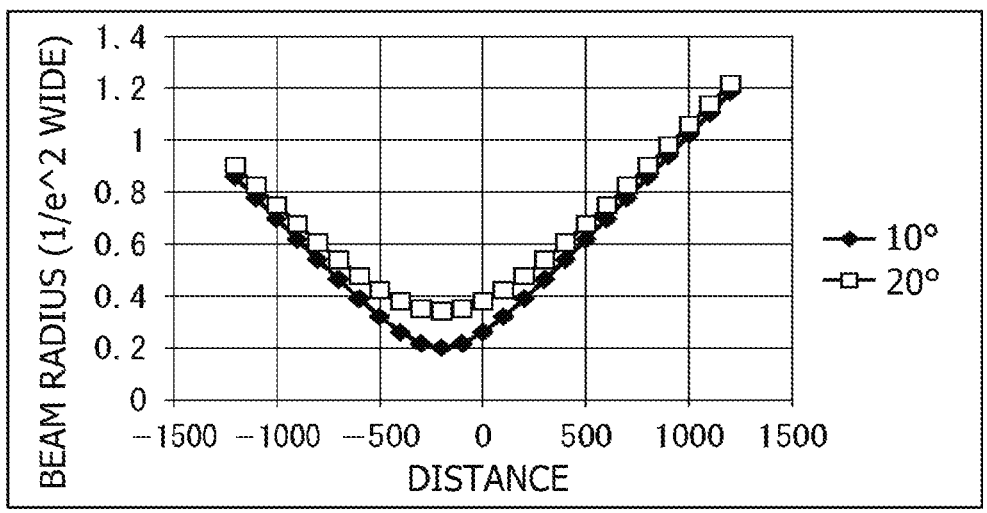
FIG. 9 is a tabular representation of the lens data in the vertical direction according to the second embodiment.
FIG. 10 is a diagram illustrating how the beam radius varies in the second embodiment.

In consideration of the fact that the beam light that impinges aslant upon the screen has a beam diameter on the screen which is cos (40°) times large, measures are taken so that the beam radius at the beam waist after passage through the third lens L3 is enlarged as much as (1/cos(40°))=1.305 times in the vertical direction with FFP being 20°, as depicted in FIG. 9.

Let us consider that a screen inclined by 40° is placed at the position of the beam waist. In this case, the beam radius is enlarged) cos(40°) times. Therefore, the beam radius at the beam waist in the horizontal direction (with FFP being 10°

C.) will be {cos(40°) squared} times larger than that of the beam waist in the vertical direction (with FFP being 20°).

The foregoing suggests that, in the case of beam light impinging aslant, the beam radius of the beam waist after passage through the third lens L3 should theoretically be amended as much as the square of the cosine of the incident angle φ with respect to the screen. This is typically depicted in FIG. 10.

FIG. 10 depicts the beam radius of the beam light, with measurement being based on the position (where distance=0) of the third lens L3.

The beam radius in the vertical direction, with FFP being 20°, is equal to the beam radius multiplying 1/cos (40°) by the beam radius in the horizontal direction with FFP being 10°. It is noted from FIG. 10 that in the case where the screen is arranged aslant near the beam waist, there occurs a difference in beam diameter in the horizontal and vertical directions but both curves have the same asymptote and hence the projector placed at an infinite distance gives the beam radii which are approximately same in the horizontal and vertical directions.

Incidentally, although the second embodiment mentioned above is on the basis of the assumption that the light impinges upon aslant with respect to the vertical direction, its concept is valid also for the light impinging upon aslant with respect to the horizontal direction.

Third Embodiment of the Present Disclosure

The second embodiment mentioned above has a disadvantage that the beam diameter tends to fluctuate in the horizontal and vertical directions in the case where the screen is placed near the beam waist. Consequently, it is necessary to consider the actual distance for screen arrangement if it is important to place the screen near the projector. In other words, it is desirable that the beam radii should be almost the same in the horizontal and vertical directions within the certain range of distance in which the screen will be actually placed.

This object will be achieved by slightly shifting at least either of the beam waists in the horizontal and vertical directions which are defined in the above-described second embodiment.

The third embodiment to be mentioned below differs from the second embodiment mentioned above in that the beam waist in the vertical direction is shifted toward the third lens L3 by only 100 mm.

The lens module is examined by calculating the lens data under the following conditions. The lens data thus obtained are depicted in FIGS. 11 and 12.

FIG. 11 depicts the data for FFP at 10° in the horizontal direction, and FIG. 12 depicts the data for FFP at 20° in the vertical direction.

Figure 13:
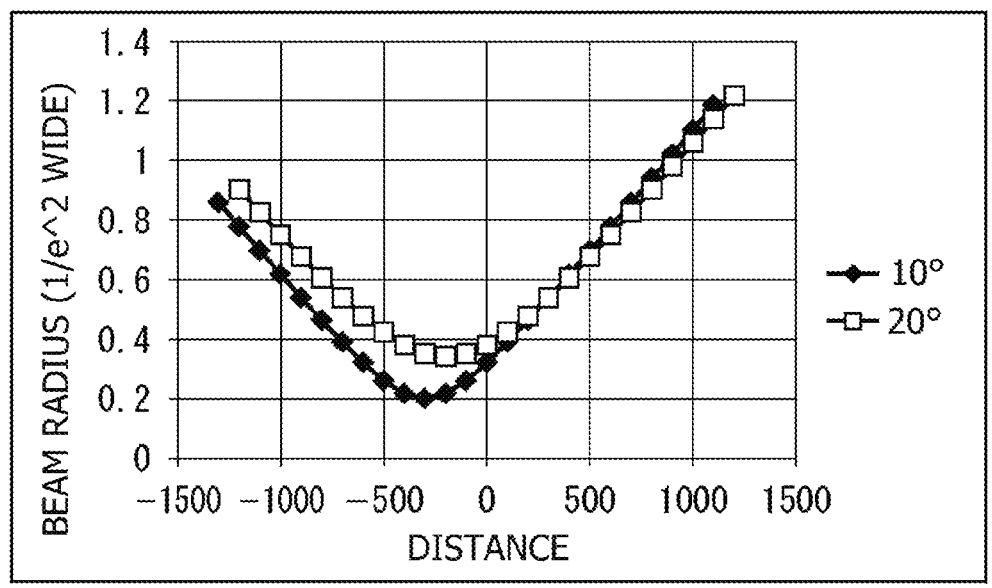
FIG. 13 is a diagram illustrating how the beam radius varies in the third embodiment.

FIG. 13 depicts the beam radius of the beam light, with measurement being based on the position (where distance=0) of the third lens L3.

It is clear from FIG. 13 that the beam radii in the horizontal ant vertical directions can be made practically same within the range of distance for screen arrangement from the neighborhood of 0 to 1000 mm.

Fourth Embodiment of the Present Disclosure

The first to third embodiments mentioned above theoretically demonstrate the structure to realize the short throw distance. Therefore, the argument is concentrated on the situation in which the screen is placed aslant or vertically with respect to the direction in which only one beam light propagates. The fourth embodiment is concerned with the projector of laser scanning type that employs a MEMS mirror.

Figure 14:
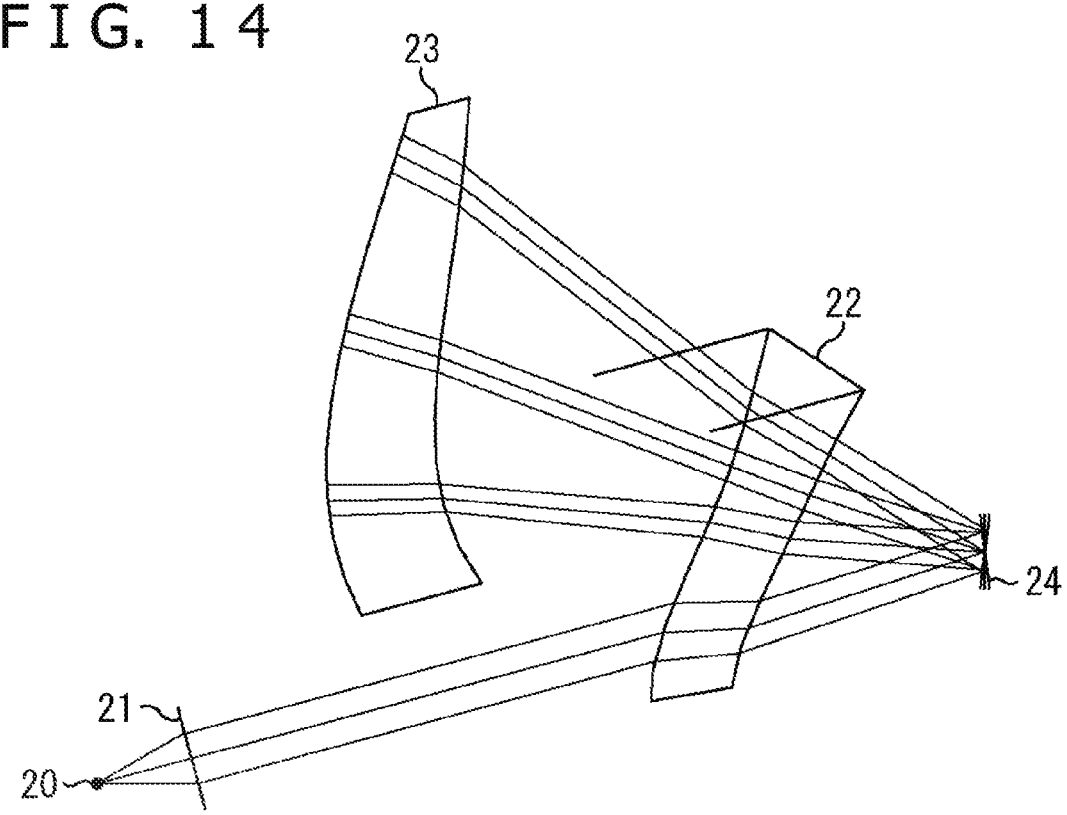
FIG. 14 is a schematic diagram depicting an example of a structure of a lens module according to a fourth embodiment.

FIG. 14 depicts an example of the lens module pertaining to the fourth embodiment.

The lens module according to the fourth embodiment works in the following way. First, the LD 20 emits a laser beam. The laser beam passes through the collimator lens 21 (also called collimator lens L1) and then a second lens 22 (also called the second lens L2), and subsequently it is reflected by a MEMS mirror 24. The reflected beam passes through the second lens 22 again and then through a third lens 23 also called the third lens L3). Eventually, the beam impinges upon the screen 30.

Figures 15, 16:
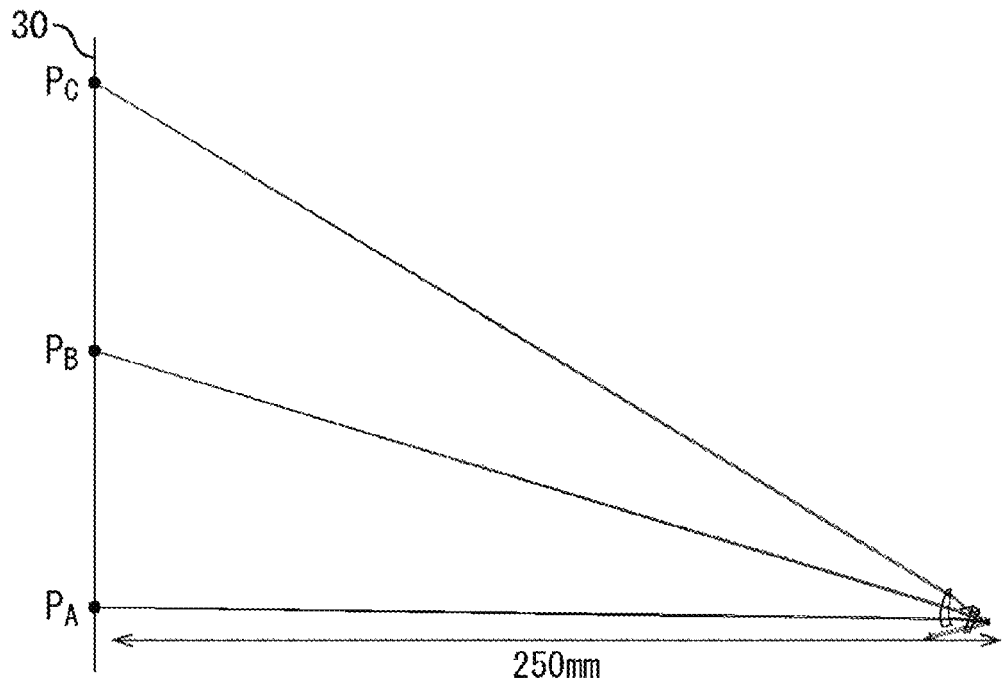
FIG. 15 is a schematic diagram depicting where to place a screen relative to the lens module according to the fourth embodiment.
FIG. 16 is a tabular representation of the lens data of the lens module according to the fourth embodiment.

FIG. 15 depicts the arrangement of the lens module (pertaining to the fourth embodiment) and the screen.

The screen 30 is placed 250 mm away from the MEMS mirror 24 in such a way that the following four vectors align with one another. The normal vector of the MEMS mirror 24 at the reference position. The normal vector of the screen 30. The vector of light incident upon the MEMS mirror 24. The vector of light reaching the center of the image. In what follows, $P_A$, $P_B$, and $P_C$ refer respectively to the lower end, the middle, and the upper end of the screen.

As FIG. 14 depicts, the lens module according to the fourth embodiment has the Littrow arrangement, which permits the beam light to pass through the second lens 22 before it impinges upon the MEMS mirror 24 and permits the beam light to pass through the second lens 22 again after it has been reflected by the MEMS mirror 24. This arrangement makes it possible to place the second lens 22 and the MEMS mirror 24 close to each other, which contributes to the size reduction of the lens module.

In addition, the above-mentioned fact that four vectors are arranged in the same plane obviates the necessity for any optical system to turn the beam light upward (because the incident angle of the beam light toward the screen 30 relies mostly on the incident angle of the beam light toward the MEMS mirror 24), which permits the beam light to impinge aslant upon the screen 30.

The aslant projection onto the screen 30 permits an audience to watch the projected image from the front without being interrupted by the projector, unlike projection by any existing projector which comes into the audience's sight.

The lens module is examined by simulation that employed the lens data given below.

FIG. 16 depicts the value of the individual lenses through which the beam light passes sequentially. Incidentally, the values for positions are represented in terms global coordinate that specifies the collimator lens L1 as the reference. Those symbols $P_A$, $P_B$, and $P_C$ in FIG. 16 refer respectively to the lower end, the middle, and the upper end of the projected image.

The collimator lens L1 is an axisymmetric lens which has a focal length of 2 mm and a magnification of 500 times. The MEMS mirror 24 is placed at the reference position. Incidentally, since the MEMS mirror 24 performs biaxial scanning in the horizontal and vertical directions, it varies in the values of ADE and BDE from time to time.

Each faces of the second lens L2 and the third lens L3 is a lens having the free-curved surfaces defined by the X-Y polynomial of Formula (12) below.

[Math 12]

$$Z = \frac{\frac{1}{R}r^2}{1 + \sqrt{1-(1+K)\frac{1}{R^2}r^2}} + \sum_{j=2}^{66} C_j X^m Y^n \quad (12)$$

$$j = \frac{(m+n)^2 + m + 3n}{2} + 1$$

FIG. 17 depicts the coefficients of the X-Y polynomial of Formula (12). Incidentally, both the second lens L2 and the third lens L3 have the surface of R=∞.

Figure 18:
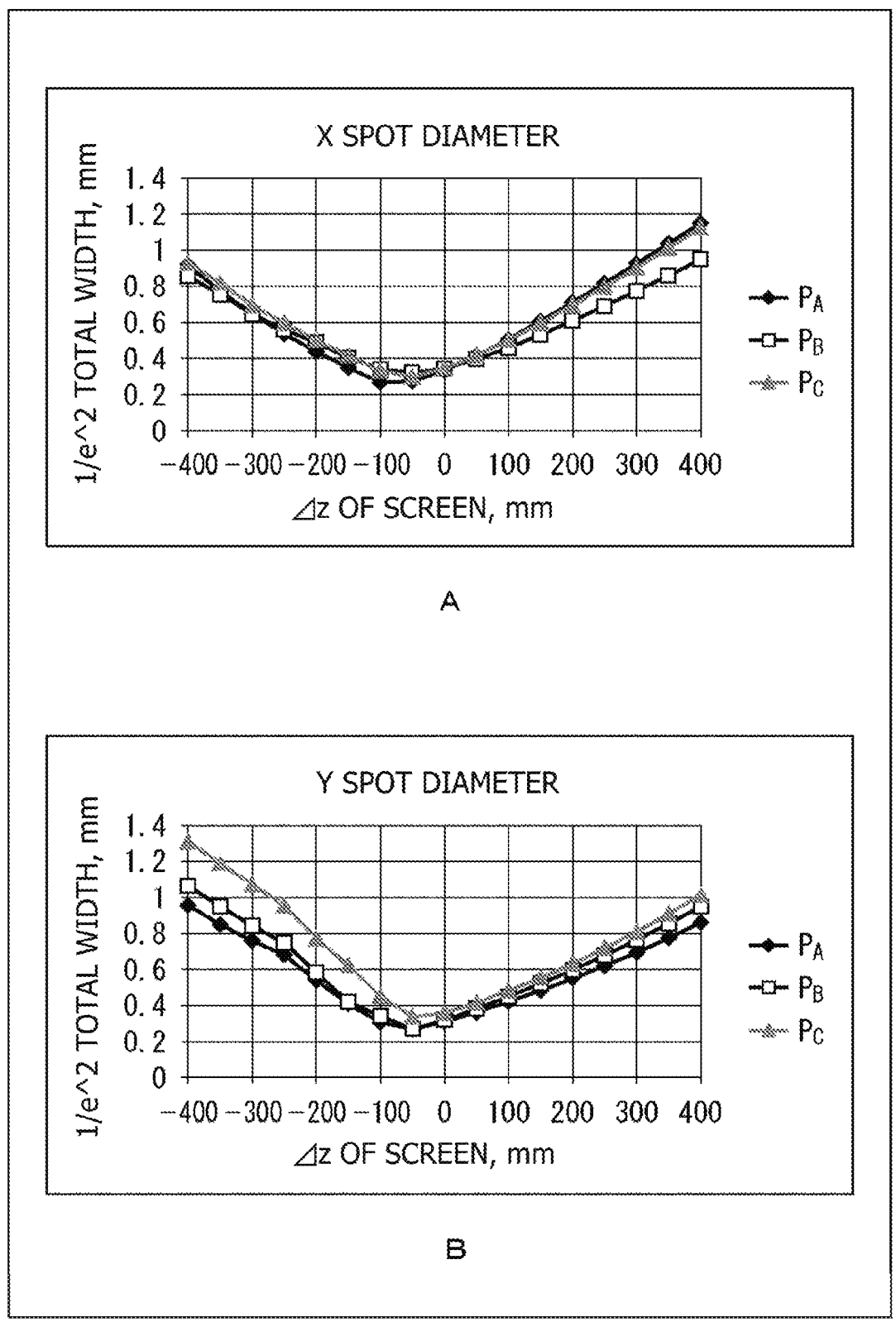
FIG. 18 is a diagram illustrating how the beam radius varies in the fourth embodiment.

FIG. 18 depicts the beam radii at the lower end $P_A$, the middle $P_B$, and the upper end $P_C$ of the projected image, which are obtained by simulation results carried out under the condition that the beam light wavelength λ is 525 nm and the FFP is 10° in the horizontal direction and 20° in the vertical direction. Part A of FIG. 18 depicts the beam radius in the horizontal direction, and Part B of FIG. 18 depicts the beam radius in the vertical direction. Incidentally, this simulation is performed with the help of BSP of CODEV.

In FIG. 18, the abscissa Δz=0 denotes the position corresponding to the distance 250 mm from the MEMS mirror 24. The MEMS mirror 24 is so installed as to oscillate at an angle suitable for the image size at that position to measure approximately 269 mm in the horizontal direction and approximately 155 mm in the vertical direction. The value of Δz is proportional to the distance to the screen 30.

Comparison between Part A and Part B in FIG. 18 apparently depicts that the lens module according to the fourth embodiment keeps approximately the same beam radius in the horizontal and vertical directions when the screen distance varies and also keeps the beam radius constant at the positions $P_A$, $P_B$, and $P_C$ on the projected image.

That the lens module is focus-free is confirmed in view of the fact that the beam radius almost linearly changes with change in the screen distance in the positive range from the neighborhood of the position where Δz=0 (250 mm away from the MEMS mirror 24). This suggests that the optical system including of three lenses, including the collimator lens L1 is focus-free and has a short throw distance.

Figure 19:
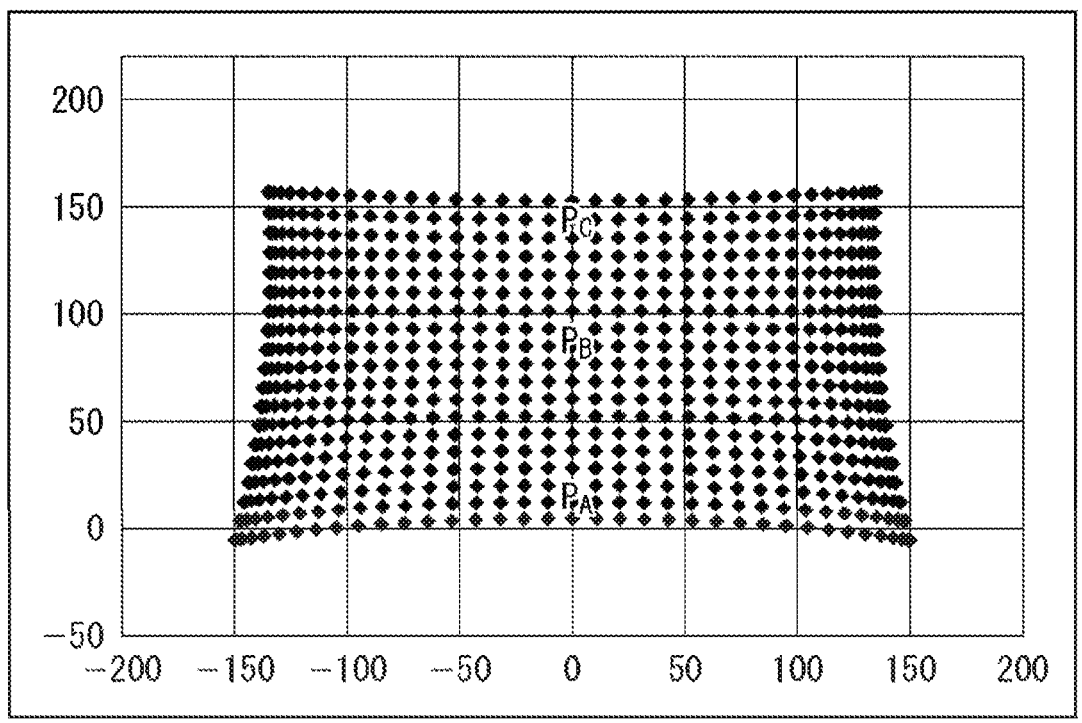
FIG. 19 depicts a projected image according to the fourth embodiment.

FIG. 19 depicts a projected image which is obtained in a case where the screen 30 is placed at the position where Δz=0 (250 mm away from the MEMS mirror 24).

It is noted from FIG. 19 that the projected image is free from distortion in the neighborhood of the center but has a large distortion in the horizontal and vertical directions in going to the edge of the image. This indicates the necessity for whatever remedy to remove this distortion.

Fifth Embodiment of the Present Disclosure

Figure 20:
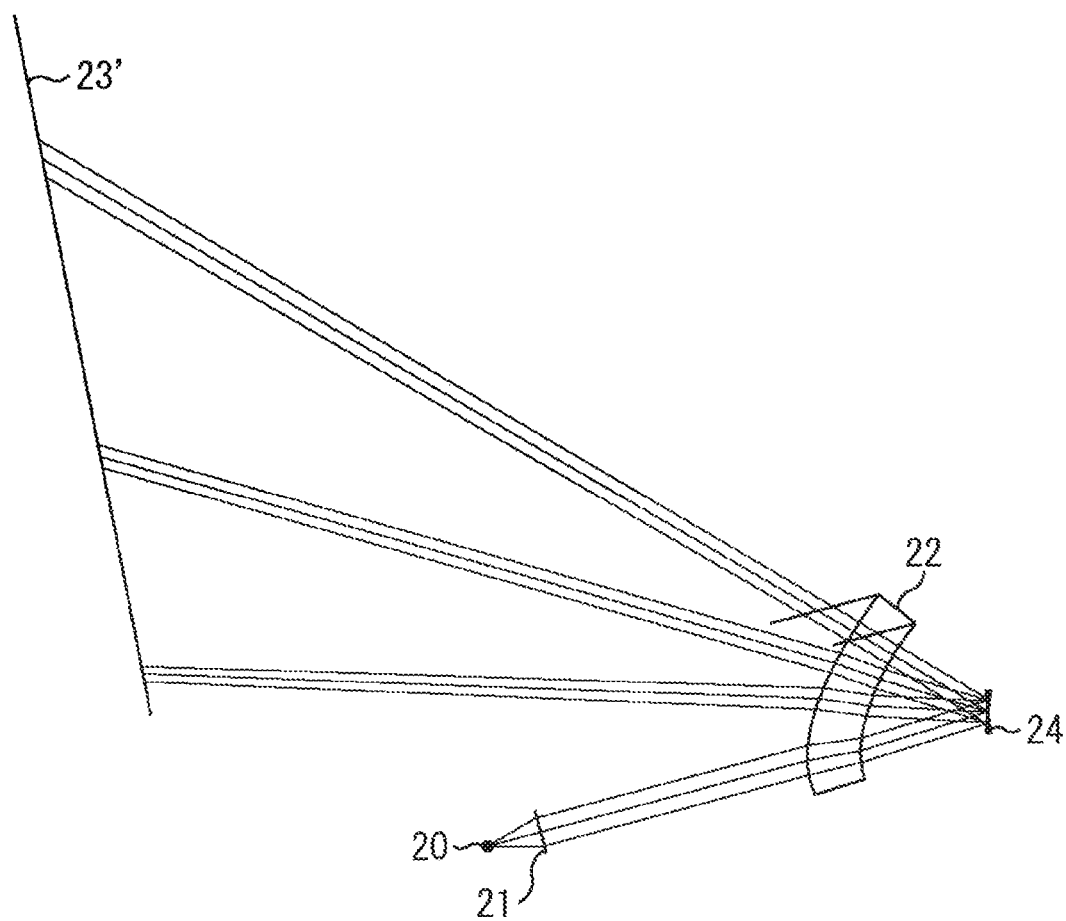
FIG. 20 is a schematic diagram depicting an example of the structure of the lens module according to a fifth embodiment.

The lens module according to the fifth embodiment is constructed as illustrated in FIG. 20.

The fifth embodiment differs from the fourth embodiment in that the lens module has the third lens 23 replaced with a free-curved mirror 23'.

The lens module according to the fifth embodiment functions in such a way that the laser light emanating from the LD 20 passes through the collimator lens 21 (also called the collimator lens L1) and the second lens 22 (also called the second lens L2) and then undergoes reflection by the MEMS mirror 24. The beam light reflected by the MEMS mirror 24 passes through the second lens 22 again and undergoes reflection by the free-curved mirror 23' to be projected to the screen 30.

The fifth embodiment permits the upward projecting angle to be adjusted more freely than the fourth embodiment owing to the free-curved mirror 23' as a substitute for the third lens 23. This leads to the larger angle of view and the larger upward projecting angle.

Figure 21:
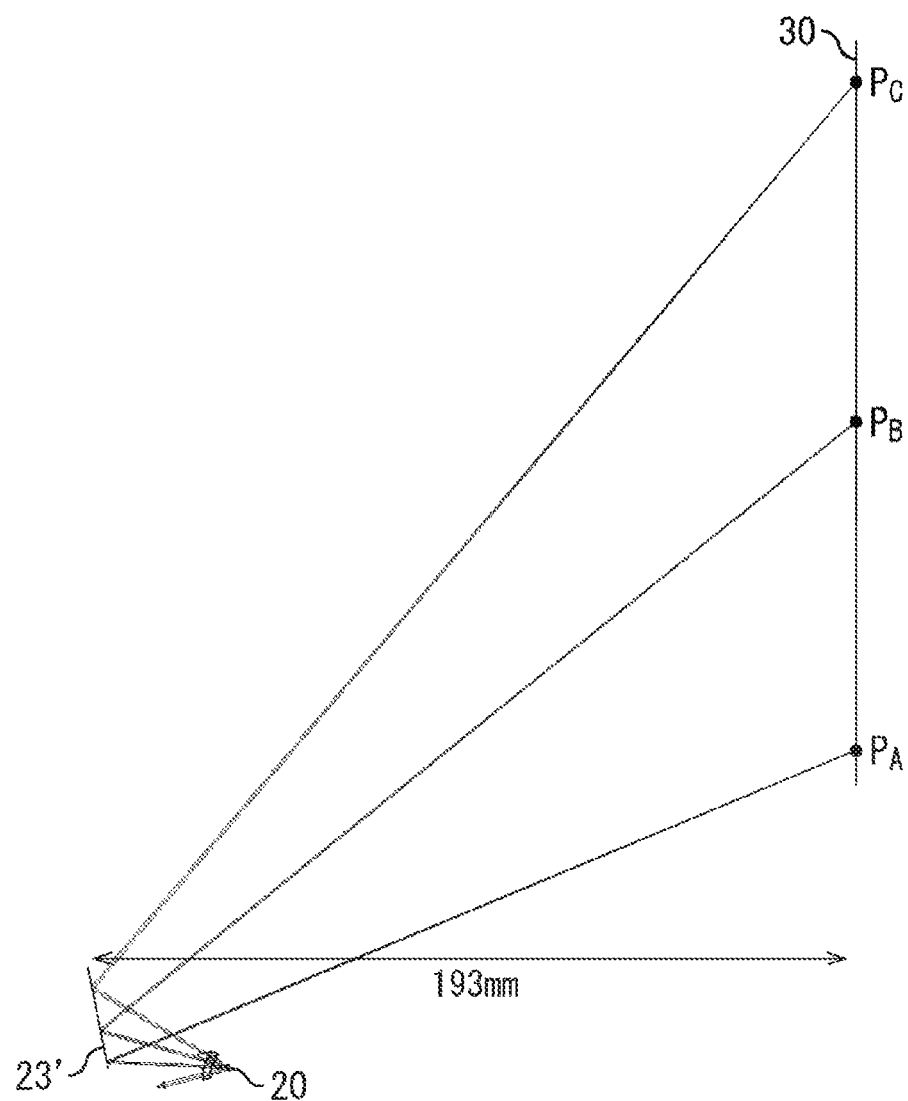
FIG. 21 is a schematic diagram depicting where to place the screen relative to the lens module according to the fifth embodiment.

FIG. 21 depicts the arrangement of the lens module according to the fifth embodiment and the screen. The screen 30 is 193 mm away from the free-curved mirror 23'.

FIG. 22 depicts the value of the individual lenses and the free-curved mirror through which the beam light passes sequentially or by which the beam light is reflected. Incidentally, the values for positions are represented in terms global coordinate that specifies the collimator lens L1 as the reference. Those symbols $P_A$, $P_B$, and $P_C$ in FIG. 22 refer respectively to the lower end, the middle, and the upper end of the projected image.

The collimator lens L1 is an axisymmetric ideal lens which has a focal length of 2 mm and a magnification of 500 times. The MEMS mirror 24 is placed at the reference position. Incidentally, since the MEMS mirror 24 performs biaxial scanning in the horizontal and vertical directions, it varies in the values of ADE and BDE from time to time.

Both of the planes of the second lens L2 and the reflecting plane of the free-curved mirror 23' are the free curves defined by the X-Y polynomial of Formula (12).

FIG. 23 depicts the coefficients of the X-Y polynomial of Formula (12). Incidentally, both the second lens L2 and the free-curved mirror 23' have the surface of R=∞.

Figure 24:
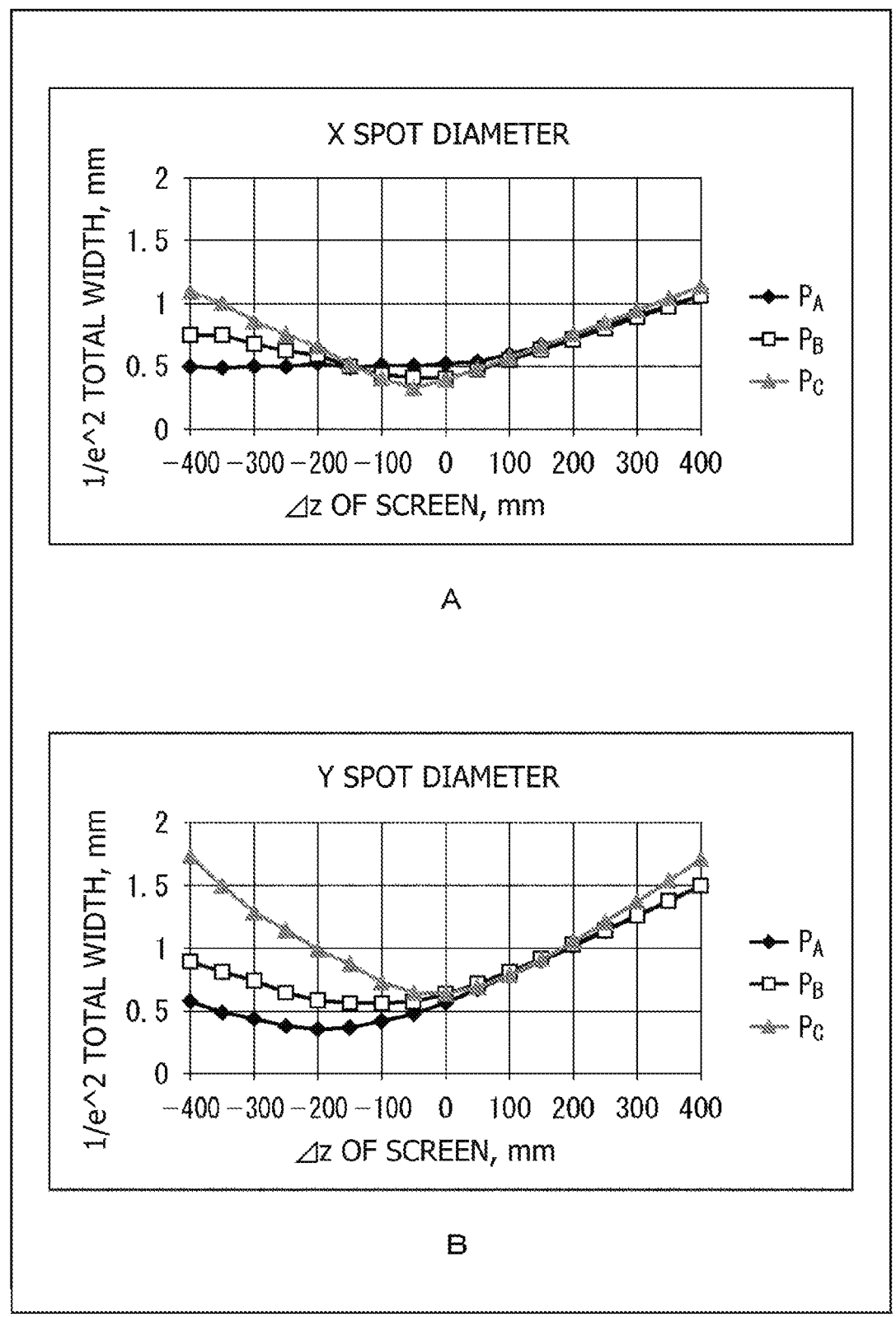
FIG. 24 is a diagram illustrating how the beam radius varies in the fifth embodiment.

FIG. 24 depicts the beam radii at the lower end $P_A$, the middle $P_B$, and the upper end $P_C$ of the projected image, which are obtained by simulation results carried out under the condition that the beam light wavelength λ is 525 nm and the FFP is 20° in the horizontal direction and 10° in the vertical direction. Part A of FIG. 24 depicts the beam radius in the horizontal direction, and Part B of FIG. 24 depicts the beam radius in the vertical direction. Incidentally, this simulation is performed with the help of BSP for CODEV.

In FIG. 24, the abscissa Δz=0 denotes the position corresponding to the distance 193 mm from the free-curved mirror 23'. The MEMS mirror 24 is so installed as to oscillate at an angle suitable for the image size at that position to measure approximately 300 mm in the horizontal direction and approximately 169 mm in the vertical direction. The value of Δz is proportional to the distance to the screen 30.

The fifth embodiment differs from the fourth embodiment in that the angle of view is larger in comparison with the fourth embodiment. These results in a larger difference in incident angle at $P_A$, $P_B$, and $P_C$ in the projected image, and it is found that the beam light reaching the position $P_C$ (at which the incident angle is large) has a larger beam radius than the beam light reaching the position $P_A$. In addition, the results of the simulation indicate that the projection distance is shifted in the horizontal direction, as in the third embodiment, for optimization within the range of the specification.

Figure 25:
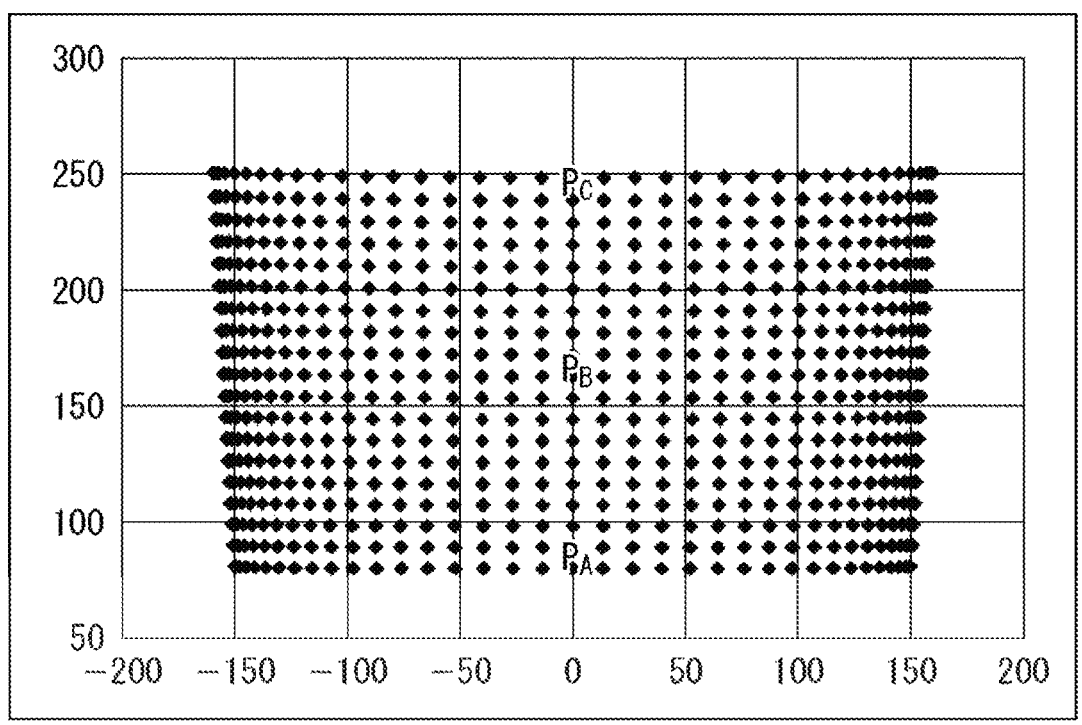
FIG. 25 depicts a projected image according to the fifth embodiment.

FIG. 25 depicts a projected image which is obtained in a case where the screen 30 is placed at the position where Δz=0 (193 mm away from the free-curved mirror 23').

The lens module according to the fifth embodiment is so designed as to be free of distortion along the horizontal line in the projected image, and hence it suffers distortion only along the vertical line. Thus the fifth embodiment is saved from the necessity for correcting distortion along the horizontal and vertical lines in the projected image unlike the fourth embodiment.

Incidentally, the distorted vertical line can be corrected to the straight line by properly adjusting the intervals of the LD's emitting time, instead of constant intervals, when the beam light is scanned in the horizontal direction.

Alternatively, the optical design may be modified such that distortion is allowed along the horizontal line in the projected image but is not allowed along the vertical line.

Distortion usually varies more or less depending on the distance to the screen or the angle of inclination of the screen. However, it is possible to adequately correct distortion if the coefficients are varied individually depending on the state of distortion.

<Application to Projector of Laser Scanning Type>

Figure 26:
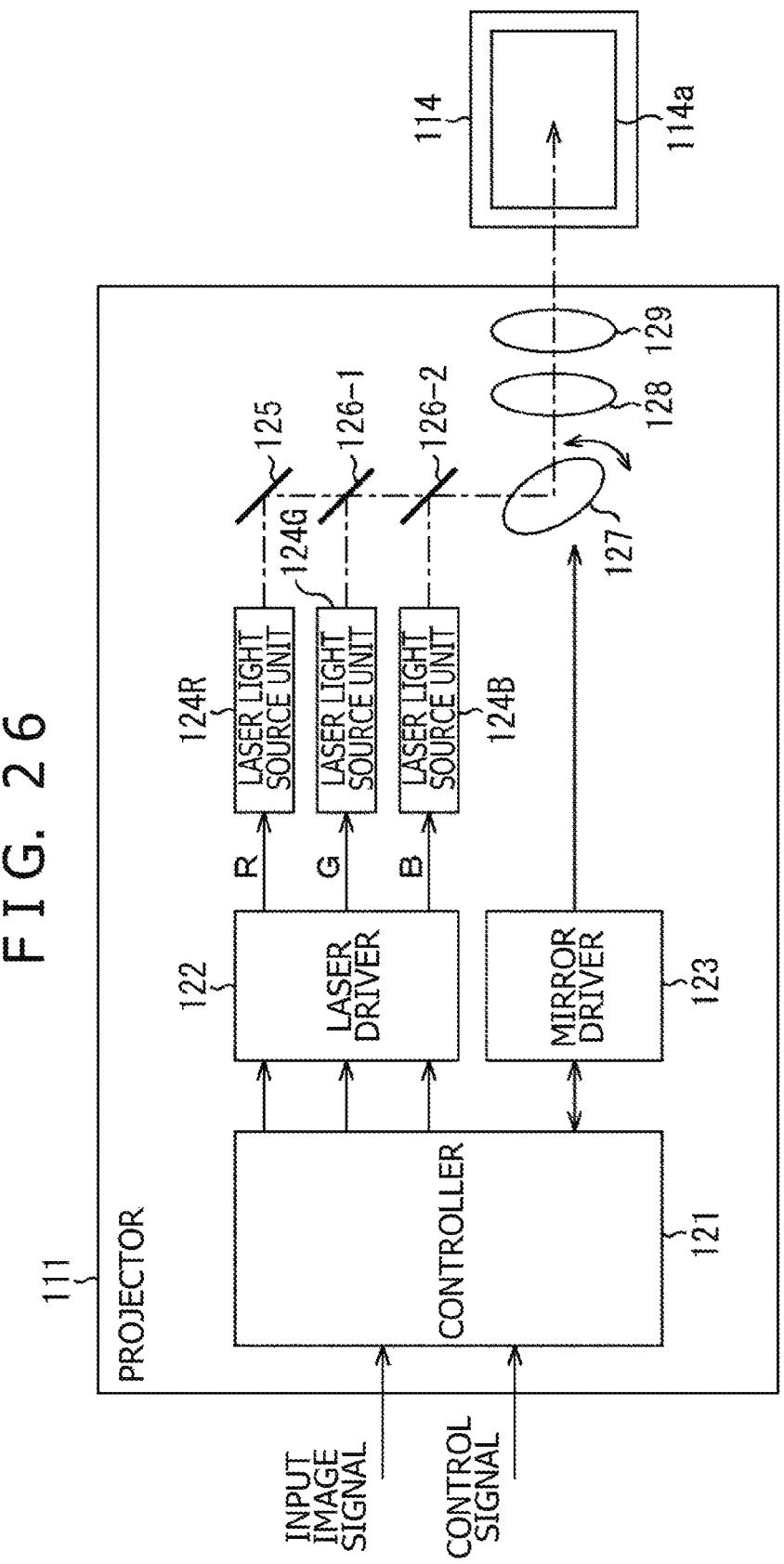
FIG. 26 is a block diagram illustrating how the first to fifth embodiments are applied to construct the projector of laser scanning type.

The first to fifth embodiments mentioned above can be applied to the projector of laser scanning type as illustrated in FIG. 26.

A projector of laser scanning type 111 is designed such that the beam light from the semiconductor laser as the light source projects an image 114a to a screen 114. The screen 114 corresponds to the screen 30 in the first to fifth embodiments mentioned above.

The projector of laser scanning type 111 includes a controller 121, a laser driver 122, a mirror driver 123, laser light source units 124R, 124G, and 124B, a mirror 125, dichroic mirrors 126-1 and 126-2, a MEMS mirror 127, and optical lenses 128 and 129.

The controller 121 is supplied with the input image signals as the image data for the image 114a to be projected to the screen 114.

The controller 121 generates by interpolation pixel data for the individual R, G, and B pixels that constitute the projected image 114a on the basis of the input image signals. The controller 121 supplies the pixel data to the laser driver 122 in synchronism with mirror synchronizing signals obtained from the mirror driver 123. The mirror synchronizing signals are intended to drive the mirror driver 123 in synchronism with the input image signals. Moreover, the controller 121 controls all the units of the projector of laser scanning type in accordance with the control signals supplied from the preceding stage.

The laser driver 122 receives pixel data for each color from the controller 121 and converts them into drive signals corresponding to the pixel value of each pixel for the projected image 114a. The resulting drive signals are supplied to the laser light source units 124R to 124B. For example, the laser driver 122 supplies the drive signal corresponding to the pixel value of the red pixel data to the laser light source unit 124R, the drive signal corresponding to the pixel value of the green pixel data to the laser light source unit 124G, and the drive signal corresponding to the pixel value of the blue pixel data to the laser light source unit 124B.

The mirror driver 123 generates the horizontal and vertical scan signals based on the resonating frequency of the MEMS mirror 127 and supplies them to the MEMS mirror 127, thereby causing the laser beam to scan in the horizontal (right and left) and vertical (up and down) directions of the screen 114. In addition, the mirror driver 123 has a light receiving unit (not depicted) that detects part of the laser beam reflected by the MEMS mirror 127, so that it adjusts scanning on the basis of the result of detection by the light receiving unit and feeds back to the controller 121 the signals detected by the light receiving unit.

The laser light source units 124R, 124G, and 124B are equivalent to the LD 20 in the first to fifth embodiments mentioned above. The laser light source units 124R, 124G, and 124B generate laser beams of colors corresponding to the drive signals (or wavelengths) supplied from the laser driver 122. For example, the laser light source unit 124R generates a laser beam of red at a level in response to the pixel value of the pixel data for red.

Figure 27:
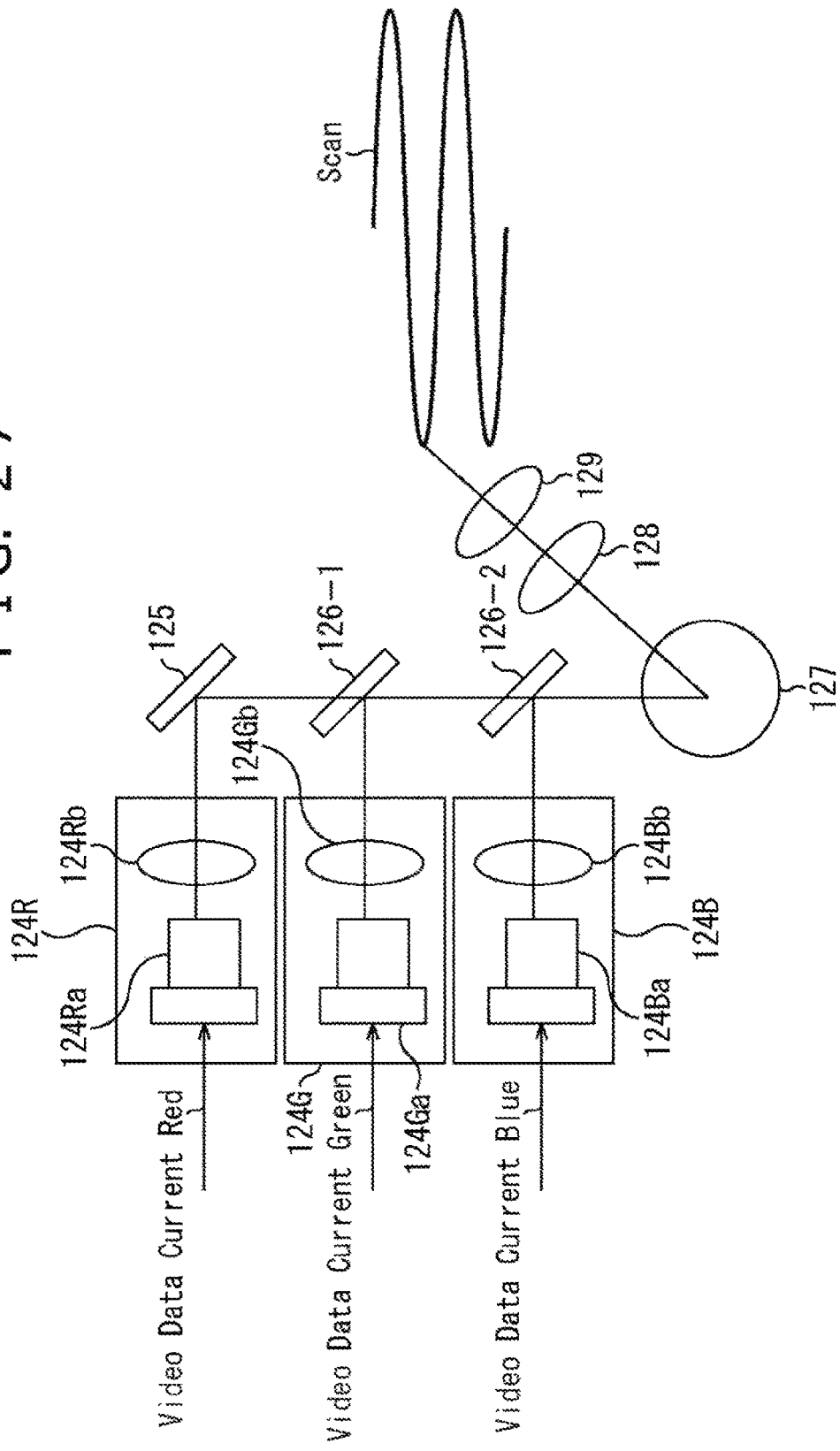
FIG. 27 is a detailed block diagram illustrating an example of the structure of laser light source units which are depicted in FIG. 26.

The laser light source units 124R, 124G, and 124B are constructed as fully depicted in FIG. 27.

The laser light source unit 124R has a beam generating unit 124Ra and a collimator lens 124Rb, with the former emitting the laser beam of wavelength for R. The collimator lens 124Rb is equivalent to the collimator lens 21 in the first to fifth embodiments mentioned above.

The laser light source units 124G and 124B are similar to the laser light source unit 124R in structure, and hence their explanation is omitted. In what follows, they will be simply referred to as laser light source unit 124 unless their discrimination is necessary.

Recurring to FIG. 26, the mirror 125 reflects the laser beam in red color which emerges from the laser light source unit 124R. The dichroic mirror 126-1 reflects the laser beam in green color which emerges from the laser light source unit 124G and also passes the laser beam in red color which has been reflected by the mirror 125. The dichroic mirror 126-2 reflects the laser beam in blue color which emerges from the laser light source unit 124B and also passes the laser beam in red color which has been reflected by the mirror 125 and the laser beam in green color which has been reflected by the dichroic mirror 126-1. Incidentally, the mirror 125 and the dichroic mirrors 126-1 and 126-2 are combined together and arranged such that the laser beams coaxially emerge from the laser light source units 124R, 124G, and 124B.

The MEMS mirror 127 is equivalent to the MEMS mirror 24 in the first to fifth embodiments mentioned above. The MEMS mirror 127 operates in response to the horizontal and vertical scanning signals supplied from the mirror driver 123, so that it reflects the laser beam supplied from the laser light source unit 124 and causes the laser beam to scan in the horizontal and vertical directions on the screen 114.

The optical lenses 128 and 129 are equivalent to the second lens L2 and the third lens L3 in the first to fifth embodiments mentioned above. Incidentally, the optical lens 129 may be replaced by a free-curved lens. The optical lenses 128 and 129 are arranged on the optical path of the laser beam propagating from the MEMS mirror 127 to the screen 114, so that the optical lenses 128 and 129 correct the optical path of the laser beam.

The projector of laser scanning type 111 constructed as mentioned above drives the MEMS mirror 127 and scans the laser beam, thereby projecting the two-dimensional image 114a to the screen 114.

The projector of laser scanning type 111 is small in size, light in weight, and low in price, and is capable of projection with a short throw length. In addition, the projector of laser scanning type 111 has the focus-free characteristics which keep the focus point stable at all times even though the distance to the screen varies and the plane of projection distorts. Therefore, it can be moved anywhere without worrying about the position of the screen.

The foregoing embodiments are not intended to restrict the scope of the present disclosure; they may be variously modified within the scope of the present disclosure.

The present disclosure may be embodied as follows.

(1) A lens module to be used for a projector, including:
a scanning unit that scans a beam light two-dimensionally by minute vibration while reflecting the beam light from a light source;
a first optical member including a free-curved lens that passes the beam light which has been reflected by the minute vibrating mirror; and
a second optical member including a free-curved mirror to reflect the beam light which has passed through the first optical member or a free-curved lens to pass the beam light which has passed through the first optical member, in which
the beam light, which has been reflected by or has passed through the second optical member, has at the same position beam waists in horizontal and vertical directions perpendicular to each other in a propagating direction of the beam light and also has beam radii coinciding in the horizontal and vertical directions.

(2) The lens module as described in paragraph (1) above, in which the beam light, which has been reflected by or has passed through the second optical member, has at the same position beam waists in the horizontal and vertical directions perpendicular to each other in the propagating direction of the beam light and also has beam radii coinciding at the beam waist in the horizontal and vertical directions.

(3) The lens module as described in paragraph (1) or (2) above, in which the beam light, which has been reflected by or has passed through the second optical member, has beam waists in the horizontal and vertical directions perpendicular to each other in the propagation direction of the beam light, the beam waists coinciding at a position a distance z away from the second optical member,
where the distance z satisfies a formula below in which $\lambda$ denotes a wavelength of the beam light and $\omega_0$ denotes a beam radius at the beam waist of the beam light.

$$\lambda z / \Pi \omega_0^2 < 1$$

(4) The lens module as described in any one of paragraphs (1) to (3) above, in which in such a case that the lens module projects the beam light, which has been reflected by or has passed through the second optical member, to a screen, which is arranged aslant with respect to the propagation direction of the beam light, the beam radius at the beam waist is larger than in a case where the lens module projects the beam light to the screen arranged perpendicular to the propagation direction of the beam light; and
the beam light, which has been reflected by or has passed through the second optical member has respective beam radii in the horizontal and vertical directions nearly coinciding on the screen arranged aslant.

(5) The lens module as described in any one of paragraphs (1) to (4) above, in which in such a case that the lens module projects the beam light, which has been reflected by or has passed through the second optical member, to the screen, which is arranged aslant with respect to the propagation direction, the beam radius at the beam waist increases in proportion to an incident angle of the beam light; and
the beam light, which has been reflected by or has passed through the second optical member, has respective beam radii in the horizontal and vertical directions nearly coinciding on the screen arranged aslant.

(6) The lens module as described in any one of paragraphs (1) to (5) above, further including:
a collimator lens which is arranged between the light source and the scanning unit and which converts Gaussian beam emanating from the light source into the beam light which is parallel in terms of geometrical optics.

(7) The lens module as described in any one of paragraphs (1) to (6) above, in which the scanning unit is MEMS mirror.

(8) The lens module as described in any one of paragraphs (1) to (7) above, in which the first optical member causes the beam light to pass through before it is reflected by the MEMS mirror as the scanning unit and also causes the beam light, which has been reflected by the MEMS mirror, to pass through.

(9) The lens module as described in any one of paragraphs (1) to (8) above, which produces the beam light projected to the screen in such a way as to give a nearly straight locus in either a horizontal direction or a vertical direction.

(10) A projector including:
a light source that emits Gaussian beam;
a collimator lens that converts the Gaussian beam emanating from the light source into a beam light which is parallel in terms of geometrical optics;
a scanning unit that scans the beam light two-dimensionally by minute vibration while reflecting a beam light from a light source;
a first optical member including a free-curved lens that passes the beam light which has been reflected by the scanning unit; and
a second optical member including a free-curved mirror that reflects the beam light which has passed through the first optical member or a free-curved lens to pass the beam light which has passed through the first optical member, in which
the beam light, which has been reflected by or has passed through the second optical member, has at the same position beam waists in horizontal and vertical directions perpendicular to each other in a propagating direction of the beam light and also has beam radii coinciding in the horizontal and vertical directions.

REFERENCE SIGNS LIST

20 LD
21 Collimator lens
22 Second lens
23 Third lens
23' Free-curved mirror
24 MEMS mirror
30 Screen
111 Projector of scanning type
121 Controller
122 Laser driver
123 Mirror driver
124R to 124B Laser light source unit
124Ra to 124Ba Beam generating unit
124Rb to 124Bb Collimator lens
125 Mirror
126-1, 126-2 Dichroic mirror
127 MEMS mirror
128, 129 Optical lens
114 Screen

The invention claimed is:
1. A lens module to be used for a projector, comprising:
a scanning unit that scans a beam light two-dimensionally by minute vibration while reflecting the beam light from a light source;
a first optical member including a free-curved lens that passes the beam light which has been reflected by the scanning unit; and
a second optical member including a free-curved mirror to reflect the beam light which has passed through the first optical member or a free-curved lens to pass the beam light which has passed through the first optical member, wherein the beam light, which has been reflected by or has passed through the second optical member, has at a same position beam waists in horizontal and vertical directions perpendicular to each other in a propagating direction of the beam light and also has beam radii coinciding in the horizontal and vertical directions, the beam light, which has been reflected by or has passed through the second optical member, has at a same position beam waists in the horizontal and vertical directions perpendicular to each other in the propagating direction of the beam light and also has beam radii coinciding at the beam waist in the horizontal and vertical directions, and the beam light, which has been reflected by or has passed through the second optical member, has beam waists in the horizontal and vertical directions perpendicular to each other in the propagation direction of the beam light, the beam waists coinciding at a position a distance z away from the second optical member, where the distance z satisfies a formula below in which $\lambda$ denotes a wavelength of the beam light and $\omega_0$ denotes a beam radius at the beam waist of the beam light:

$$\lambda z/\Pi\omega_0^2 < 1.$$

2. The lens module according to claim 1, wherein in such a case that the lens module projects the beam light, which has been reflected by or has passed through the second optical member, to a screen, which is arranged aslant with respect to the propagation direction of the beam light, the beam radius at the beam waist is larger than in a case where the lens module projects the beam light to the screen arranged perpendicular to the propagation direction of the beam light; and the beam light, which has been reflected by or has passed through the second optical member, has respective beam radii in the horizontal and vertical directions nearly coinciding on the screen arranged aslant.

3. The lens module according to claim 2, wherein in such a case that the lens module projects the beam light, which has been reflected by or has passed through the second optical member, to the screen, which is arranged aslant with respect to the propagation direction, the beam radius at the beam waist increases in proportion to an incident angle of the beam light; and the beam light, which has been reflected by or has passed through the second optical member, has respective beam radii in the horizontal and vertical directions nearly coinciding on the screen arranged aslant.

4. The lens module according to claim 1, further comprising:

a collimator lens which is arranged between the light source and the scanning unit and which converts Gaussian beam emanating from the light source into the beam light which is parallel in terms of geometrical optics.

5. The lens module according to claim 1, wherein the scanning unit is a MEMS mirror.

6. The lens module according to claim 5, wherein the first optical member causes the beam light to pass through before it is reflected by the MEMS mirror as the scanning unit and also causes the beam light, which has been reflected by the MEMS mirror, to pass through.

7. The lens module according to claim 1, which produces the beam light projected to the screen in such a way as to give a nearly straight locus in either the horizontal direction or the vertical direction.

8. A projector, comprising:

a light source that emits Gaussian beam;

a collimator lens that converts the Gaussian beam emanating from the light source into a beam light which is parallel in terms of geometrical optics;

a scanning unit that scans the beam light two-dimensionally by minute vibration while reflecting a beam light from a light source;

a first optical member including a free-curved lens that passes the beam light which has been reflected by the scanning unit; and a second optical member including a free-curved mirror that reflects the beam light which has passed through the first optical member or a free-curved lens to pass the beam light which has passed through the first optical member, wherein the beam light, which has been reflected by or has passed through the second optical member, has at a same position beam waists in horizontal and vertical directions perpendicular to each other in a propagating direction of the beam light and also has beam radii coinciding in the horizontal and vertical directions, the beam light, which has been reflected by or has passed through the second optical member, has at a same position beam waists in the horizontal and vertical directions perpendicular to each other in the propagating direction of the beam light and also has beam radii coinciding at the beam waist in the horizontal and vertical directions, and the beam light, which has been reflected by or has passed through the second optical member, has beam waists in the horizontal and vertical directions perpendicular to each other in the propagation direction of the beam light, the beam waists coinciding at a position a distance z away from the second optical member, where the distance z satisfies a formula below in which $\lambda$ denotes a wavelength of the beam light and $\omega 0$ denotes a beam radius at the beam waist of the beam light:

$$\lambda z/\Pi\omega_0^2 < 1.$$

9. The projector according to claim 8, wherein in such a case that the lens module projects the beam light, which has been reflected by or has passed through the second optical member, to a screen, which is arranged aslant with respect to the propagation direction of the beam light, the beam radius at the beam waist is larger than in a case where the lens module projects the beam light to the screen arranged perpendicular to the propagation direction of the beam light; and the beam light, which has been reflected by or has passed through the second optical member, has respective beam radii in the horizontal and vertical directions nearly coinciding on the screen arranged aslant.

10. The projector according to claim 9, wherein in such a case that the lens module projects the beam light, which has been reflected by or has passed through the second optical member, to the screen, which is arranged aslant with respect to the propagation direction, the beam radius at the beam waist increases in proportion to an incident angle of the beam light; and the beam light, which has been reflected by or has passed through the second optical member, has respective beam radii in the horizontal and vertical directions nearly coinciding on the screen arranged aslant.

11. The projector according to claim 8, further comprising:
a collimator lens which is arranged between the light source and the scanning unit and which converts Gaussian beam emanating from the light source into the beam light which is parallel in terms of geometrical optics.

12. The projector according to claim 8, wherein the scanning unit is a MEMS mirror.

13. The projector according to claim 12, wherein the first optical member causes the beam light to pass through before it is reflected by the MEMS mirror as the scanning unit and also causes the beam light, which has been reflected by the MEMS mirror, to pass through.

14. The projector according to claim 8, which produces the beam light projected to the screen in such a way as to give a nearly straight locus in either the horizontal direction or the vertical direction.

* * * * *